(12) United States Patent
Harada et al.

(10) Patent No.: US 6,882,401 B2
(45) Date of Patent: Apr. 19, 2005

(54) LIGHT MODULATION MEDIUM AND LIGHT MODULATION METHOD

(75) Inventors: Haruo Harada, Ebina (JP); Hiroshi Arisawa, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 100 days.

(21) Appl. No.: 10/614,121

(22) Filed: Jul. 8, 2003

(65) Prior Publication Data
US 2004/0119933 A1 Jun. 24, 2004

(30) Foreign Application Priority Data
Dec. 20, 2002 (JP) .......................... 2002-370123

(51) Int. Cl.⁷ .............................................. G02F 1/137
(52) U.S. Cl. .................... 349/169; 349/175; 349/35; 349/77; 349/78
(58) Field of Search ................................ 349/175, 185, 349/77, 80

(56) References Cited
U.S. PATENT DOCUMENTS
6,034,752 A * 3/2000 Khan et al. .................... 349/74
6,618,102 B1 * 9/2003 Harada et al. ................. 349/78

FOREIGN PATENT DOCUMENTS
JP 2001-154219 8/2001

* cited by examiner

Primary Examiner—Kenneth Parker
Assistant Examiner—Phu Vu
(74) Attorney, Agent, or Firm—Morgan, Lewis & Bockius LLP

(57) ABSTRACT

A light modulation medium comprises a light modulation element having a pair of substrates and plural light modulation layers arranged between the substrates to form a multilayer structure and made of cholesteric liquid crystal adapted to change the liquid crystal orientation in response to application of a predetermined electric field, in which the ratio of the threshold electric field at which the liquid crystal orientation is moved from a planar state to a focal conic state of a first light modulation layer of the light modulation element to that of a second light modulation layer is not less than 0.3 and the ratio of the dielectric constant in a planar state of liquid crystal orientation of the first light modulation layer to that of the second light modulation layer is not less than 4.

10 Claims, 21 Drawing Sheets

Fig.4A PLANAR
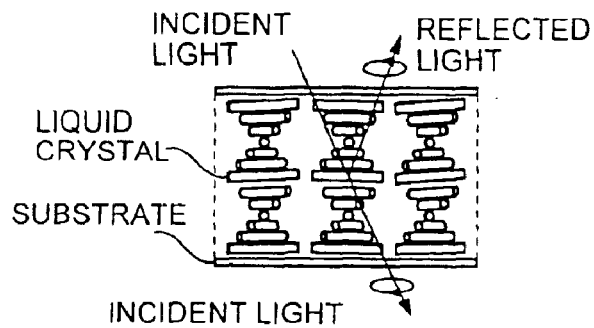
Fig.4B FOCAL CONIC
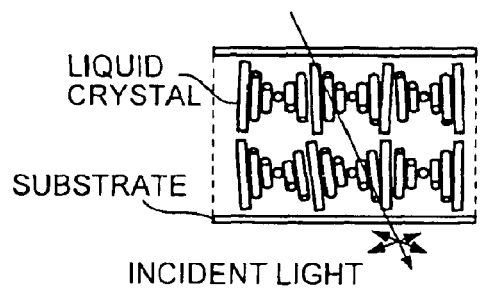
Fig.4C HOMEOTROPIC
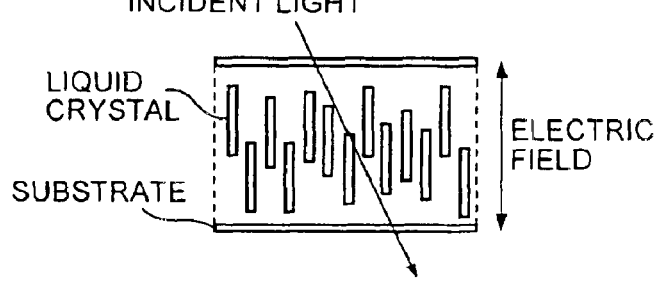
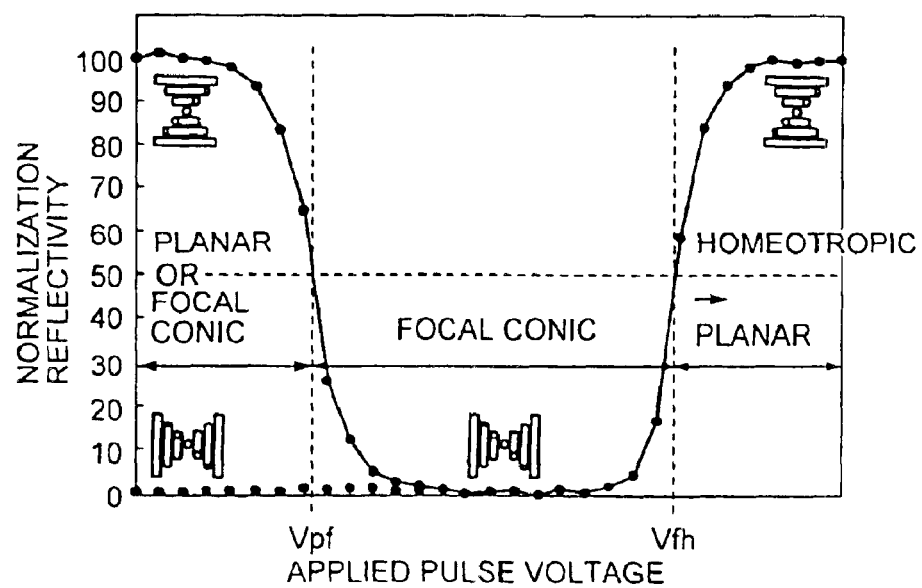
Fig.5

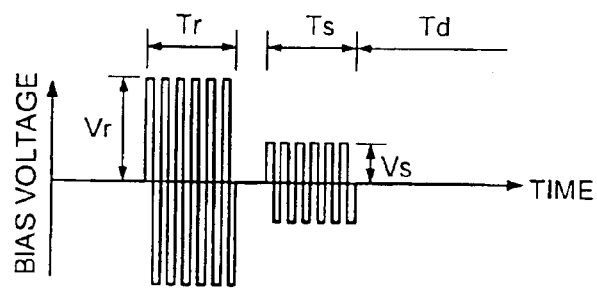
Fig.8
|  |  | RESET VOLTAGE Vr | |
|---|---|---|---|
|  |  | Vc | Vd |
| SELECT VOLTAGE Vs | Va | ●/○ | ○/○ |
|  | Vb | ●/● | ○/● |
H LAYER / L LAYER
Fig.9
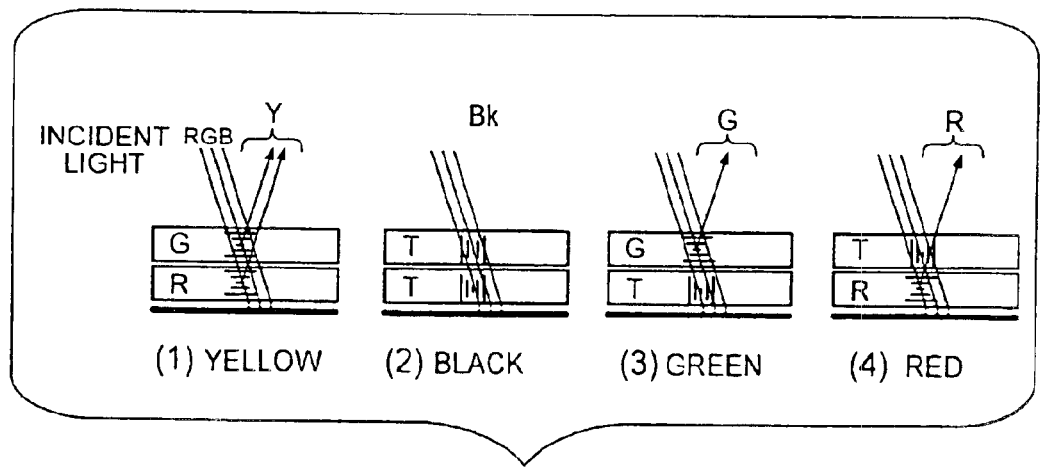
Fig.10

PULSE VOLTAGE $V_{DD}$ APPLIED TO LIGHT
MODULATION LAYERS AS PUT TOGETHER
OF LIGHT MODULATION ELEMENT 16B

| | | RESET LIGHT INTENSITY Pr (BIAS VOLTAGE $Vr_B=V1_B$) | |
|---|---|---|---|
| | | $Pc_B(Vc_B)$ | $Pd_B(Vd_B)$ |
| SELECT LIGHT INTENSITY $Ps_B$ (BIAS VOLTAGE $Vs_B=V2_B$) | $Pa_B(Va_B)$ | ●/○ | ○/○ |
| | $Pb_B(Vb_B)$ | ●/● | ○/● |

H LAYER / L LAYER

LIGHT MODULATION MEDIUM AND LIGHT MODULATION METHOD

BACKGROUND OF THE INVENTION

1. Field of the Invention

This invention relates to a light modulation medium having a light modulation element formed by laying plural light modulation layers to realize a multilayer structure and adapted to change the optical characteristic of each of the light modulation layers by controlling the electric field applied to the light modulation element and also to a light modulation method to be used with such a light modulation medium.

2. Description of the Related Art

Consumption of large volumes of paper has been a serious problem of modern societies because it leads to destructions of forest resources that supply raw materials of paper pulps and environmental pollutions due to dumping and burning of paper wastes. However, due to the development of information society that involves dissemination of personal computers and a wide use of the Internet, paper is being consumed at an increasing rate particularly as short-life documents that are used to allow temporary accesses to electronic data. Therefore, there is a strong demand for writable display mediums that can replace paper.

A display/memory medium that can store data without any power source, display a full color image and redraw it by means of an external device has been proposed along with a method and a device for drawing an image on such as display/memory medium (see Patent Document 1).

According to the prior art invention, a display/memory medium is prepared by arranging plural display layers between a pair of substrates to form a multilayer structure. The layers selectively reflect light of different colors and are made of respective cholesteric liquid crystals that show different threshold voltages relative to a write signal applied externally. The image drawing device is prepared separately from the display/memory medium and provided with a pair of write electrodes for holding the display/memory medium between them and a drive circuit. An image is displayed by applying a write signal that is a voltage selected from plural different voltages separated from each other by the threshold voltages of the cholesteric liquid crystals of the different display layers and has a refresh period, a select period and a subsequent display period when no voltage is applied and the voltage Vr that is applied in the refresh period and the voltage Vs that is applied in the select period show a relationship of Vr>Vs.

[Patent Document 1]

Japanese Patent Application Laid-Open Publication No. 2001-154219 (Paragraph No. 0093 through Paragraph No. 0107, FIGS. 6 through 12)

However, the light modulation layers of the display/memory medium need to have a wide margin of operation relative to each other in order to make them display an image with an enhanced level of contrast by means of the method disclosed in the above Patent Document 1.

In the case of a light modulation element having two light modulation layers laid one on the other to which a voltage is applied, the margin of operation Vm of the light modulation layers relative to each other is determined by the formula below;

$$2 \times (Vpf90 \text{ of } B - Vpf10 \text{ of } A)/(Vpf90 \text{ of } B + Vpf10 \text{ of } A),$$

where Vpf90 is the voltage at which the normalization reflectivity is 90% and Vpf10 is the voltage at which the normalization reflectivity is 10% when each of the light modulation layers moves from a planar state to a focal conic state, while B represents the light modulation layer that shows a higher threshold voltage and A represents a light modulation layer that shows a lower threshold voltage when moving from a planar state to a focal conic state.

Preferably, Vm has a positive value.

However, it is difficult to actually observe the margin of operation of each of the light modulation layers relative to each other in a state when a number of light modulation layers are arranged in a light modulation element. But, the margin of operation of each of the light modulation layers relative to each other can be confined within a predetermined range if the margin of operation can be substantially induced from the threshold electric field or the like of each of the light modulation layers as separated from each other before the layers are put together to form the light modulation element and each of the light modulation layers is designed to show the predetermined threshold value as used for the induction.

When each of the light modulation layers is formed from cholesteric liquid crystal showing positive dielectric constant anisotropy, the margin of operation for each of the light modulation layers to move from a planar state to a focal conic state is smaller than the margin of operation for it to move from a focal conic state to a homeotropic state so that the former margin of operation requires attention.

SUMMARY OF THE INVENTION

The present invention has been made in view of the above circumstances and provides a light modulation medium having plural light modulation layers arranged to form a multilayer structure and adapted to be able to enhance the contrast of the displayed image by optimizing the parameters of each of the light modulation layers that define the margin of operation thereof and a light modulation method to be used with such a light modulation medium.

A light modulation medium according to the invention has a light modulation element having a pair of substrates and plural light modulation layers arranged between the substrates to form a multilayer structure and made of cholesteric liquid crystal adapted to change the electro-optic characteristics in response to application of a predetermined electric field, characterized in that the ratio of the threshold electric field at which the liquid crystal orientation is moved from a planar state to a focal conic state of a first light modulation layer of the light modulation element to that of a second light modulation layer is not less than 0.3 and the ratio of the dielectric constant in a planar state of liquid crystal orientation of the first light modulation layer to that of the second light modulation layer is not less than 4.

With the above arrangement, a desired margin of operation is secured for the light modulation medium to improve the contrast of the displayed image because the ratio of the threshold electric field values and that of the dielectric constants of plural light modulation layers are optimized.

In another aspect of the invention, there is provided a light modulation method of preparing a light modulation medium having a pair of substrates and plural light modulation layers arranged between the substrates to form a multilayer structure and made of cholesteric liquid crystal adapted to change liquid crystal orientation in response to application of a predetermined electric field, wherein the ratio of the threshold electric field at which the liquid crystal orientation is moved from a planar state to a focal conic state of a first light modulation layer of plural light modulation layers to that of a second light modulation layer is not less than 0.3 and the ratio of the dielectric constant in a planar state of liquid crystal orientation of the first light modulation layer to that of the second light modulation layer is not less than 4; and causing it to display a color tone corresponding to the combination of liquid crystal orientations of the plural light modulation layers by sequentially applying plural voltages to change the liquid crystal orientations of plural light modulation layers between the electrodes and moving each of the light modulation layers to a planar or focal conic state.

Because a light modulation medium according to the invention has a light modulation element formed by arranging plural light modulation layers and showing a wide margin of operation, it is possible to clearly change the liquid crystal orientation of each of the light modulation layers by applying various voltages between the electrodes and cause the light modulation medium to display clear color tones by means of combinations of the liquid crystal orientations of the light modulation layers.

Thus, according to the light modulation medium and the method of the present invention, a desired margin of operation is secured for the light modulation medium to improve the contrast of the displayed image because the parameters of each of light modulation layers of the light modulation element are optimized.

BRIEF DESCRIPTION OF THE DRAWINGS

Preferred embodiments of the present invention will be described in detail based on the following figures, wherein:

FIGS. 4A to 4C are a schematic illustration of cholesteric liquid crystal showing positive dielectric constant anisotropy, illustrating different states it can take;

FIG. 5 is a graph schematically illustrating the optical characteritic of cholesteric liquid crystal that can be observed immediately after applying a pulse voltage;

FIG. 8 is a graph illustrating the bias voltage that is applied from the write device 2;

FIG. 9 is a schematic illustration of the voltages that are applied in the reset period Tr and the select period Ts and the electro-optic states of each of the light modulation layers of the first embodiment;

FIG. 10 is a schematic illustration of light modulation displays by the first embodiment of light modulation medium;

DETAILED DESCRIPTION OF THE PREFERRED EMBODIMENTS

Now, preferred embodiments of a light modulation medium and a light modulation method according to the present invention will be described.

Firstly, a light modulation element that each embodiment of light modulation medium according to the invention has will be described.

Each embodiment of light modulation medium according to the invention has at least a light modulation element that is formed by laying plural light modulation layers to realize a multilayer structure. The multilayer light modulation element formed by laying plural light modulation layers can be provided with a wide margin of operation by increasing the threshold electric field ratio of light modulation layers having respective threshold electrode fields that are close to each other as observed before laying them one on the other and at which their optical characteristics change or the ratio of the electric fields that are to be applied to the light modulation layers as a function of the impedance and the thickness of each light modulation layer.

The threshold electric field ratio can be evaluated by preparing the plural light modulation layers independently and by determining the threshold electric field of each of them at which the layer moves from a planar state into a focal conic state. When the light modulation layers are made to have the same and identical thickness, the threshold electric field ratio can be determined as threshold voltage ratio of the light modulation layers.

The ratio of the electric fields to be applied to the light modulation layers can be evaluated by determining the impedances and the thicknesses of the light modulation layers having respective threshold electric fields that are close to each other. When the light modulation layers are made of a liquid crystal material showing a large specific electric resistance, the ratio of the electric fields to be applied can be substantially induced from the dielectric constant ratio of the light modulation layers. Furthermore, when the light modulation layers are made to have the same and identical thickness, the ratio of the electric fields to be applied can be determined as capacitance ratio of the light modulation layers.

Figure 1:
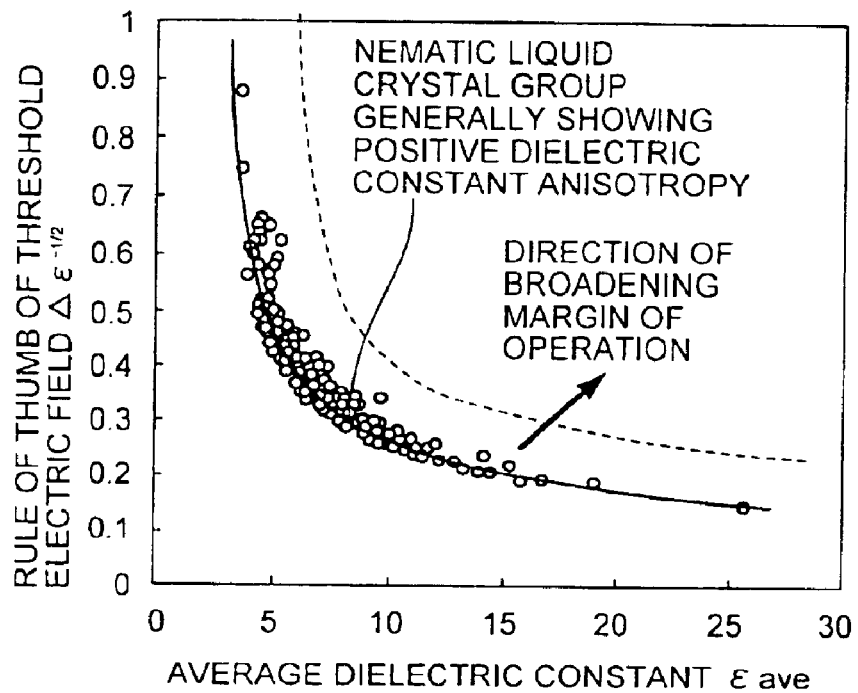
FIG. 1 is a graph illustrating the relationship between the relative dielectric constant and the threshold voltage of a group of nematic liquid crystals showing positive dielectric constant anisotropy.

FIG. 1 is a graph illustrating the relationship between the average dielectric constant of a group of nematic liquid crystals showing positive dielectric constant anisotropy and the dielectric constant anisotropy $\Delta\epsilon$ as raised to the power of $-\frac{1}{2}$ that can be used as rule of thumb for determining the threshold electric field.

As indicated by the curve of the solid line in FIG. 1, nematic liquid crystal showing positive dielectric constant anisotropy has a relative dielectric constant that is positively correlated with its dielectric constant anisotropy and therefore its threshold electric field tends to decrease as its relative dielectric constant increases. Besides, the chiral ingredient that is added to nematic liquid crystal in order to obtain cholesteric liquid crystal normally operates as diluent to reduce the dielectric constant ratio. Therefore, it is difficult for cholesteric liquid crystal obtained by using a mixture of nematic liquid crystal showing positive dielectric constant anisotropy and a chiral ingredient to show a large applied electric field ratio realized by raising the dielectric constant ratio and at the same time a large threshold electric field ratio in order to broaden the margin of operation.

On the other hand, with a technique of mixing nematic liquid crystal showing positive dielectric constant anisotropy and nematic liquid crystal showing negative dielectric constant anisotropy, it is possible to shift the relationship between the relative dielectric constant and the threshold electric field toward the curve of the dotted line in FIG. 1. Particularly, the above described effect of addition is remarkable in the case of negative nematic liquid crystal having a cyano group showing a large dipole moment and extending in the direction of the short axis because it shows a large relative dielectric constant and a large negative dielectric constant anisotropy.

Therefore, cholesteric liquid crystal obtained by adding a chiral ingredient to a mixture of nematic liquid crystal showing positive dielectric constant anisotropy and nematic liquid crystal showing negative dielectric constant anisotropy is used for the light modulation layers of a light modulation element that are formed as multilayer structure. Then, the mixing ratio of nematic liquid crystal showing positive dielectric constant anisotropy and nematic liquid crystal showing negative dielectric constant anisotropy is changed to prepare cholesteric liquid crystals showing different positive dielectric constant anisotropies. Subsequently, each of the cholesteric liquid crystals is observed in an independent cell for the threshold electric field at which it moves from a planar state into a focal conic state and for the relative dielectric constant in a planar state and the margin of operation of each of them is determined from the threshold electric field ratio and the dielectric constant ratio of the cholesteric liquid crystals having respective threshold electric fields that are close to each other and the electro-optic response observed by connecting cells in series.

Then, each of the light modulation layers of a light modulation element is formed from a group of cholesteric liquid crystals that show a positive margin of operation and the embodiments of light modulation medium that are described hereinafter are prepared by using such a light modulation element.

Figure 2:
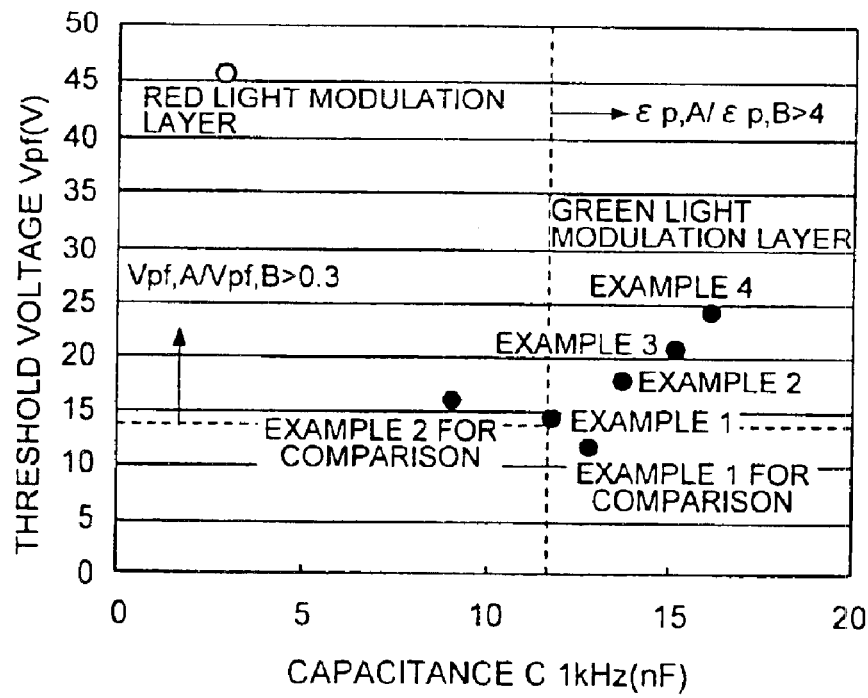
FIG. 2 is a graph illustrating the results of a measurement of the electrostatic capacitances and the threshold voltages of light modulation elements having a single light modulation layer prepared by using cholesteric liquid crystals showing various different positive dielectric constant anisotropies.

FIG. 2 is a graph illustrating the results of a measurement of the threshold voltages Vpf (V) of light modulation elements having a single light modulation layer prepared by using cholesteric liquid crystals showing various different positive dielectric constant anisotropies and the electrostatic capacitances C (nF) at 1 kHz. Note that, because the light modulation layers were made to have the same and identical thickness, their electrostatic capacitances and their threshold voltages were observed in place of the relative dielectric constants and the threshold electric fields respectively.

In FIG. 2, the cholesteric liquid crystal adapted to selectively reflect red light was prepared by mixing a 84.0 weight % of nematic liquid crystal showing positive dielectric constant anisotropy (ZLI3806: tradename, available from Merck), a 12.8 weight % of chiral ingredient 1 (R811: tradename, available from Merck) and a 3.2 weight % of chiral ingredient 2 (R1011: tradename, available from Merck). Cholesteric liquid crystal adapted to selectively reflect green light was used in each of the examples, which will be described hereinafter.

In Example 1, a 95.0 weight % of nematic liquid crystal showing positive dielectric constant anisotropy (available from Seimi Chemical) and a 5.0 weight % of dicyano-type nematic liquid crystal showing negative dielectric constant anisotropy (1-n-butoxy-4-(4'-trans-n-pentylcyclohexylcarboxy)-2,3-dicyanobenzene) and a 14.4 weight % of chiral ingredient 1 (R811: tradename, available from Merck) and a 3.6 weight % of chiral ingredient 2 (R1011: tradename, available from Merck) were added to the mixture.

The specimen of Example 2 differs from that of Example 1 in that dicyano-type nematic liquid crystal showing negative dielectric constant anisotropy was added by 10 weight %.

The specimen of Example 3 differs from that of Example 1 in that dicyano-type nematic liquid crystal showing negative dielectric constant anisotropy was added by 15 weight %.

The specimen of Example 4 differs from that of Example 1 in that dicyano-type nematic liquid crystal showing negative dielectric constant anisotropy was added by 20 weight %.

The specimen of Example 1 for Comparison differs from that of Example 1 in that no dicyano-type nematic liquid crystal showing negative dielectric constant anisotropy was added.

The specimen of Example 2 for Comparison differs from that of Example 1 in that a 85.0 weight % of nematic liquid crystal showing positive dielectric constant anisotropy (ZLI4389: tradename, available from Merck), a 12.0 weight % of chiral ingredient 1 (R811: tradename, available from Merck) and a 3.0 weight % of chiral ingredient 2 (R1011: tradename, available from Merck) were mixed together.

TABLE 1

|  | Threshold electric field ratio | Dielectric constant ratio | Margin of operation $V_M$ |
|---|---|---|---|
| Example 1 | 0.315 ○ | 4.04 ○ | 0.009 |
| Example 2 | 0.388 ○ | 4.72 ○ | 0.247 |
| Example 3 | 0.456 ○ | 5.18 ○ | 0.438 |
| Example 4 | 0.531 ○ | 5.53 ○ | 0.515 |
| Exp. 1 for Cmp. | 0.253 | 4.40 ○ | −0.234 |
| Exp. 2 for Cmp. | 0.352 ○ | 3.10 | −0.241 |

Table 1 shows the threshold electric field ratio (Vpf of green liquid crystal/Vpf of red liquid crystals) obtained by measuring the threshold voltages of the specimens, the dielectric constant ratio (electrostatic capacitance of green liquid crystal/electrostatic capacitance of red liquid crystals) obtained by measuring the electrostatic capacitances of the specimens and the margin of operation Vm obtained on the basis of the electro-optic responses measured by connecting the cells in series, using the cholesteric liquid crystal adapted to selectively reflect red light as reference.

The margin of operation Vm is determined by using the formula below, assuming that a state where the normalization reflectivity of each light modulation layer is 90% or more is a reflecting state of a saturated level and a state where the normalization reflectivity of each light modulation layer is 10% or less is a transmitting state of a saturated level;

$$Vm = 2 \times (Vg90 - Vr10)/(Vr90 + Vg10),$$

where Vr90 represents the voltage that makes the normalization reflectivity of cholesteric liquid crystal adapted to selectively reflect red light to be equal to 90% and Vg10 represents the voltage that makes the normalization reflectivity of cholesteric liquid crystal adapted to selectively reflect green light to be equal to 10%.

As seen from Table 1, the margin of operation shows a positive value in each of Examples 1 through 4 and a negative value in each of Example 1 and 2 for Comparison, while the margin of operation is positive when the threshold electric field ratio is not less than 0.3 and the dielectric constant ratio is not less than 4.0.

Now, a light modulation medium and a light modulation method according to the invention will be described by way of embodiments.

(1st Embodiment)

Figure 3:
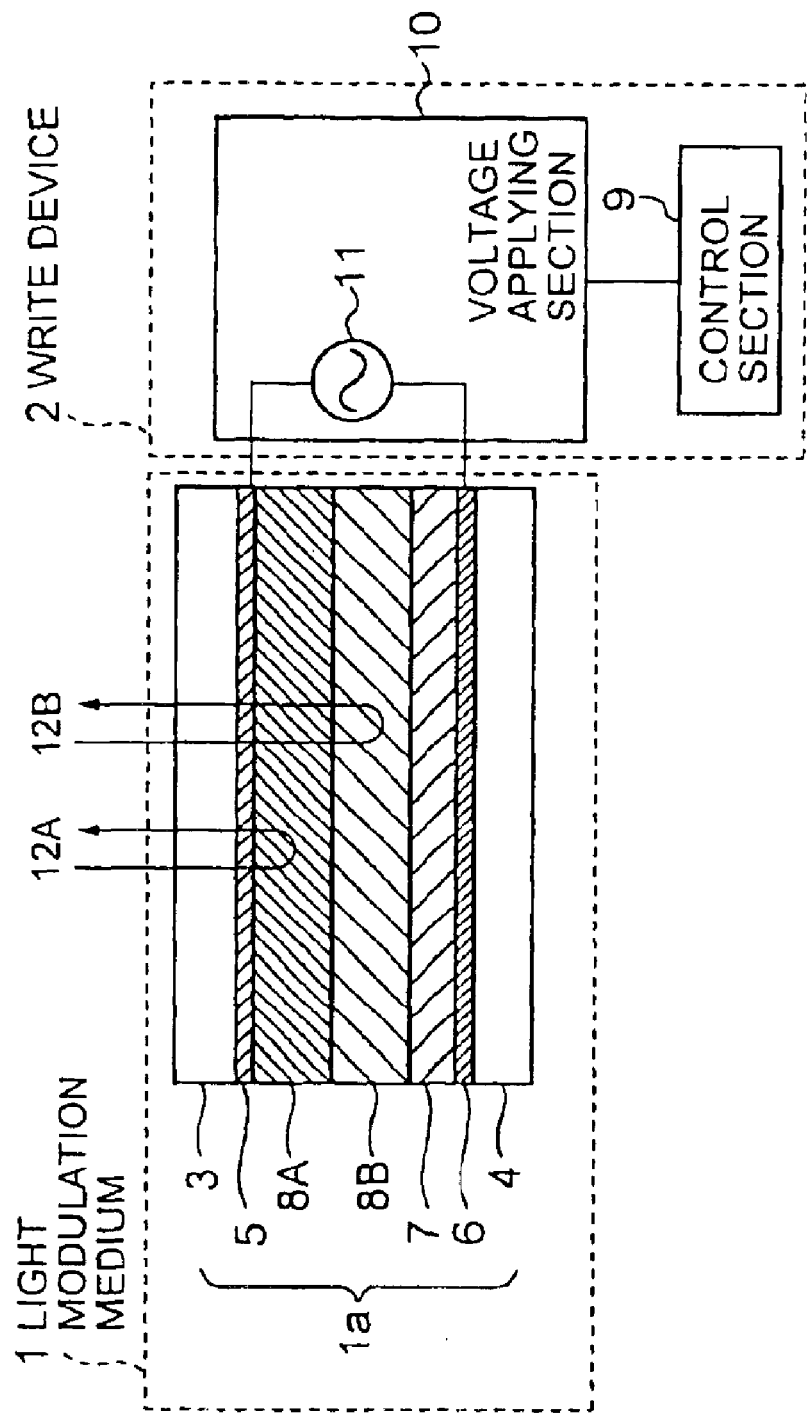
FIG. 3 is a schematic illustration of the first embodiment of light modulation medium and light modulation method along with a write device adapted to be used with the embodiment.

FIG. 3 schematically illustrates the first embodiment of light modulation medium and light modulation method along with a write device adapted to be used with the embodiment.

A light modulation medium 1 of FIG. 3 is formed by a light modulation element 1a that is by turn formed by arranging a light modulation layer 8A adapted to reflect a beam of read light 12A, a light modulation layer 8B adapted to reflect a beam of read light 12B and a light absorption layer 7 between a pair of substrates 3, 4 respectively carrying electrodes 5, 6 that are formed on the inner surfaces thereof. Thus, the light modulation medium 1 has a multi-layer structure.

A write device 2 that is used for this embodiment of light modulation method has a voltage applying section 10 that applies a bias voltage 11 between the electrodes 5, 6 of the light modulation medium 1 and a control section 9 that controls the voltage applying section 10 according to the light modulation pattern to be drawn in the light modulation medium 1.

The electrodes 5, 6 of the light modulation medium 1 are connected to the terminals to which the bias voltage 11 of the voltage applying section 10 of the write device 2 is applied so that a voltage controlled by the control section 9 is applied to them.

The substrates 3, 4 of the light modulation medium 1 are formed from glass, silicon or polymer film of polyethyleneterephthalate, polysulfone, polyethersulfone, polycarbonate or the like. The substrate 3 is made to transmit at least the beams of read light 12A, 12B. If necessary, a known functional film such as a dirt prevention film, an anti-abrasion film, an anti-light reflection film or a gas barrier film may be formed on the surfaces of the substrates 3 and 4.

The bias electrodes 5, 6 are made of electrically conductive thin film of metal such as gold or aluminum, metal oxide such as indium oxide or tin oxide or electrically conductive organic polymer such as polypyrrole, polyacetylene or polyaniline and the electrode 5 is made to transmit at least the beams of read light 12A, 12B. If necessary, a known functional film such as a liquid crystal orientation film, an adhesion improvement film, an anti-light reflection film or a gas barrier film may be formed on the surfaces of the electrodes 5 and 6.

The light absorption layer 7 is made of an inorganic pigment having an insulative property, such as a cadmium type, chromium type, cobalt type, manganese type or carbon type inorganic pigment, an organic dye or pigment such as an azo type, anthraquinone type, indigo type, triphenylmethane type, nitro type, phthalocyanine type, perylene type, pyrrolopyrrole type, quinacridone type, polycyclic quinone type, squarium type, azulenium type, cyanine type, pyrylium type or anthrone type dye or pigment or a material obtained by dispersing such a dye or pigment into a polymeric binder. It is made to absorb light at least in a wavelength range of the beams of read light 12A and 12B.

The light modulation layers 8A, 8B are made of at least cholesteric liquid crystal (chiral nematic liquid crystal or chiral smectic liquid crystal). However, it may alternatively be made to have a structure formed only from cholesteric liquid crystal, a structure containing network-shaped polymer in a continuous phase of liquid crystal, a structure where liquid crystal is dispersed as droplets in polymer binder skeleton, a structure where liquid crystal is wrapped in polymer shells for encapusulation in order to produce microcapusules or a structure where liquid crystal is encapusulated in order to form microcapusules that are dispersed in a polymer binder skeleton.

When a structure formed only from cholesteric liquid crystal or a structure containing network-shaped polymer in a continuous phase of liquid crystal is used, it is preferable that a separation substrate made of a material similar to that of the substrates 3, 4 is inserted between the light modulation layers 8A and 8B in order to prevent the cholesteric liquid crystal of the light modulation layer 8A and that of the light modulation layer 8B from being mixed with each other and ball type or cylinder type spacers made of glass or polymer are mixed into the light modulation layers 8A, 8B or projections of a polymeric material are formed on the substrates 3, 4 or the separation substrate in order to define the thickness of each of the light modulation layers 8A and 8B.

Figure 11:
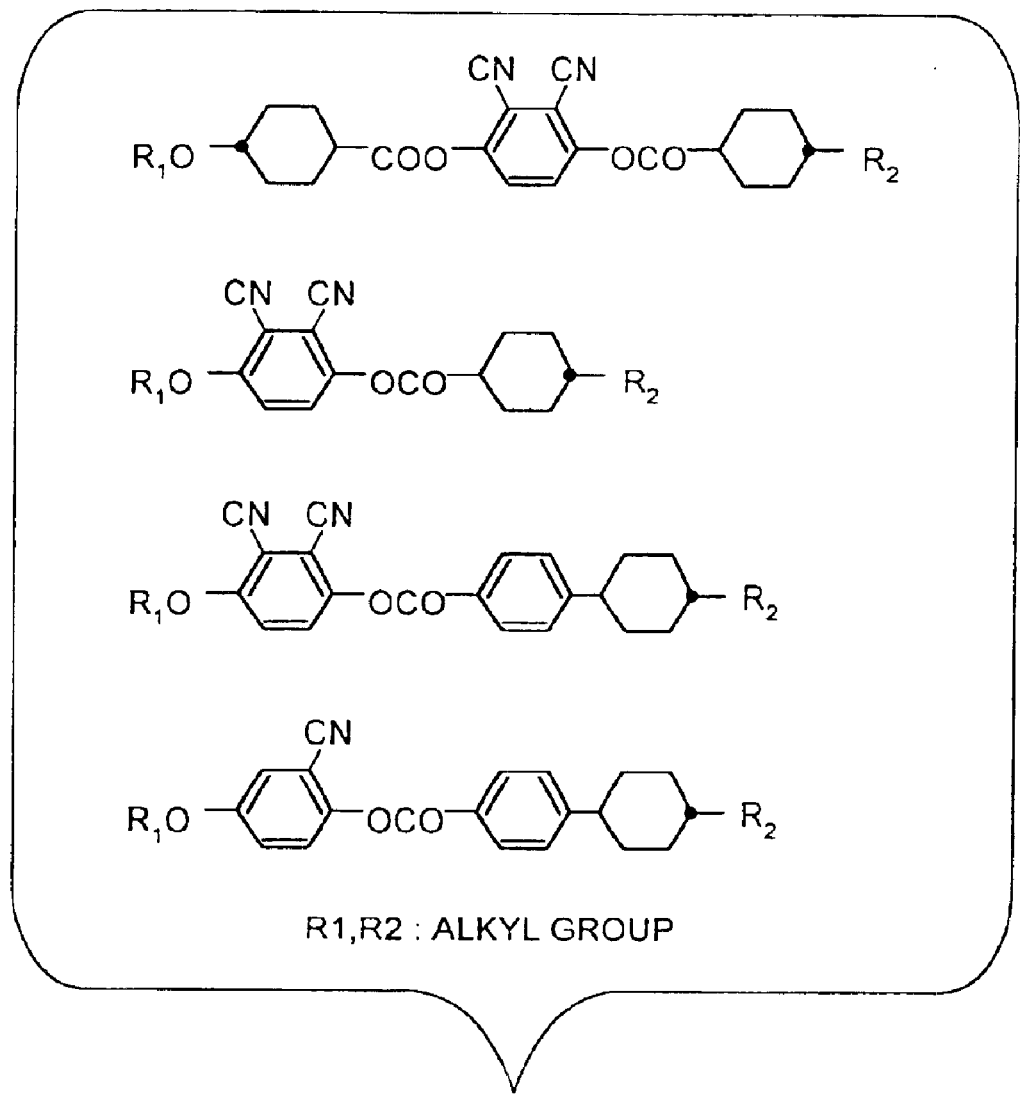
FIG. 11 is a list of chemical formulas of compounds having a cyano group extending in the direction of the short axis of the molecule and showing negative dielectric constant anisotropy.

Materials that can be used for the cholesteric liquid crystal of the light modulation layers 8A and 8B include Schiff base type, azo type, azoxy type, benzonate type, biphenyl type, terphenyl type, cyclohexylcarboxylate type, phenylcyclohexane type, biphenylcyclohexane type, pyrimidine type, dioxane type, cyclohexylcyclohexane ester type, cyclohexylethane type, cyclohexane type, tolane type, alkenyl type, stilbene type and condensed polycyclic type nematic liquid crystal, smectic liquid crystal or a mixture thereof to which one or more than one steroid type cholesterol derivatives or one or more than one chiral ingredients of Schiff base type, azo type, ester type and/or biphenyl type optically active materials are added. Additionally, a compound having a cyano group extending in the direction of the short axis shown in FIG. 11 for example and showing negative dielectric constant anisotropy is mixed with the cholesteric liquid crystal of the light modulation layer 8A or 8B having a greater relative dielectric constant in order to make the cholesteric liquid crystal show positive dielectric constant anisotropy as a whole. The light modulation layer 8A is made to show a threshold voltage ratio of 0.3 or more at which the layer moves from a planar state into a focal conic state and a dielectric constant ratio of 4 ore more in a planar state.

Molecules of cholesteric liquid crystal are arranged in such a way that the director draws a spiral. Thus, cholesteric liquid crystal gives rise to a phenomenon of selective reflection of interfering with and reflecting selectively only the circularly polarized component of incident light whose electric field vector draws a spatial locus in a direction that agrees with that of rotation of liquid crystal molecules and whose wavelength of propagation in the inside of liquid crystal is equal to the pitch of the turns of the spiral. With respect to an incident light coming from the axial direction of the spiral, if the central wavelength of reflected light is $\lambda$, the variable range of wavelength of reflected light is $\Delta\lambda$, the pitch of the turns of the spiral is p, the average refraction index in a plane that rectangularly intersects the axis of the spiral is n and the double refraction index is $\Delta n$, they show relationships expressed by equations $\lambda = n \cdot p$ and $\Delta\lambda = \Delta n \cdot p$. If the pitch of the turns is regulated so as to make the wavelength of reflected light is found within the visible wavelength zone, the light modulation layers of cholesteric liquid crystal presents a clear color. The pitch of the turns of the spiral of cholesteric liquid crystal can be adjusted by regulating its chemical structure or the mixing ratio of the chiral ingredients and nematic liquid crystals or smectic liquid crystals. When mixing the chiral ingredients and nematic liquid crystals or smectic liquid crystals, a known technique of adding plural chiral ingredients may advantageously be used if a desired wavelength is not obtained for reflected light by the original mixture. Additionally, a known technique of adding plural chiral ingredients that show different directions of turns or oppositely directed temperature dependencies may be used in order to compensate the temperature dependency of the pitch of the turns of cholesteric liquid crystal.

Cholesteric liquid crystal showing positive dielectric constant anisotropy can take any of the three states including a planar state in which the axis of the spiral is substantially perpendicular relative to the cell surface and the phenomenon of selective reflection occurs relative to incident light as shown in FIG. 4A, a focal conic state in which the axis of the spiral lies substantially in parallel with the cell surface and incident light is transmitted while being forwardly scattered to a small extent as shown in FIG. 4B and a homeotropic state in which the spiral structure is loosened and the liquid crystal director faces the direction of the electric field to substantially completely transmit incident light as shown in FIG. 4C.

Of the above three states, the planar state and the focal conic state can exist bistably without any voltage being applied thereto. Therefore, the state of molecular orientation of cholesteric liquid crystal cannot be unequivocally defined relative to the voltage applied to the light modulation layers. More specifically, if the initial state is planar, the state sequentially changes from planar (p) to focal conic (f) and then to homeotropic (h) as the applied voltage rises. If the initial state is the focal conic, the state changes sequentially from focal conic to homeotropic as the applied voltage rises. If, on the other hand, the voltage being applied to the light modulation layers falls abruptly to nil, both planar and focal conic remain unchanged but homeotropic changes to planar.

The light modulation medium of this embodiment has electrodes formed respectively on the inner surfaces of a pair of substrates. However, a light modulation medium does not necessarily need to have electrodes. If it does not have any electrodes, it may be so arranged that the write device has a pair of electrodes that sandwich a substrate and a predetermined voltage is applied to the electrodes.

FIG. 5 is a graph schematically illustrating the optical characteristic of cholesteric liquid crystal that can be observed immediately after applying a pulse voltage.

In FIG. 5, the vertical axis represents the normalization reflectivity when the highest reflectivity is 100 and the lowest reflectivity is 0, whereas the horizontal axis represents the applied pulse voltage.

The curved solid line in the graph shows the optical characteristic of cholesteric liquid crystal as observed immediately after the application of a pulse voltage. As shown, it changes from a homeotropic state to a planar state to selectively reflect light when the applied pulse voltage rises above threshold voltage Vfh but remains in a focal conic state to transmit light when the applied voltage is between Vpf and Vfh. However, it is either in a planar state to selectively reflect light or in a focal conic state to transmit light as if no pulse voltage had been applied thereto when the applied voltage does not exceed Vpf.

Thus, transitional regions exist among the planar, focal conic and homeotropic states. Therefore, a state where the normalization reflectivity is not lower than 50 is defined to be a selective reflection state and a state where the normalization reflectivity is not higher than 50 is defined to be a transmission state. The threshold voltage from the planar state to the focal conic state is defined to be Vpf, while the threshold voltage from the focal conic state to the homeotropic state is defined to be Vfh.

Figure 6:
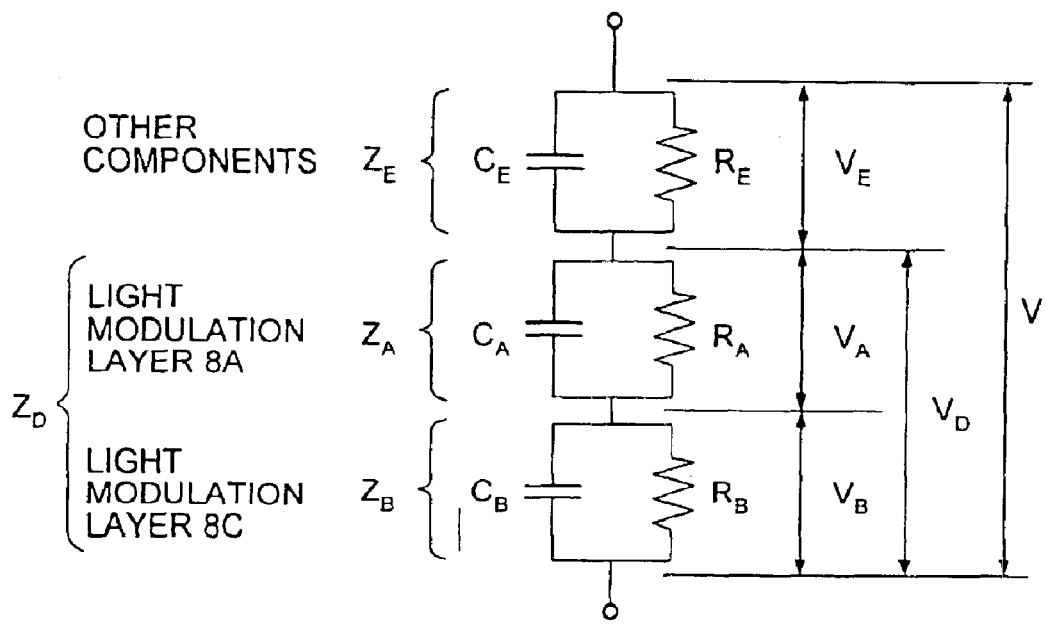
FIG. 6 is a circuit diagram of an equivalent circuit of the first embodiment of light modulation medium.

FIG. 6 is a circuit diagram of an equivalent circuit of this embodiment of light modulation medium.

In FIG. 6, $Z_E$ represents the equivalent impedance of the components other than the light modulation layers 8A, 8B that is equal to the sum of the impedances of the electrodes 5, 6 and the light absorption layer 7 of this embodiment of light modulation medium of FIG. 3. The impedance $Z_E$ can be approximated by means of a parallel circuit of an equivalent electrostatic capacitance $C_E$ and an equivalent resistor $R_E$. In FIG. 6, $V_E$ represents the voltage that is applied to the impedance $Z_E$ when a bias voltage V is applied between the bias electrodes 5, 6 of the light modulation medium 1 from the write device 2, while $Z_A$, $Z_B$ and $Z_D$ respectively represent the impedance of the light modulation layer 8A, that of the light modulation layer 8B and that of the two light modulation layers put together. The light modulation layers can be approximated respectively by means of parallel circuits of electrostatic capacitances $C_A$ and $C_B$ and resistors $R_A$ and $R_B$. In FIG. 6, $V_A$, $V_B$ and $V_D$ represent respectively the voltages that are applied to the light modulation layer 8A, the light modulation layer 8B and the two light modulation layers as put together when a bias voltage V is applied between the electrodes 5, 6 of the light modulation medium 1 from the write device 2. Since the cholesteric liquid crystal of the light modulation layers shows dielectric constant anisotropy, the impedances $Z_A$ and $Z_B$ of the light modulation layers change depending on the state of orientation of the liquid crystal.

When voltage $V_D$ is applied to the two light modulation layers as put together of the light modulation medium 1, the voltages $V_A$ and $V_B$ applied respectively to the light modulation layer 8A and the light modulation layer 8B are expressed by the following equations;

$$V_A=(Z_A/Z_D)V_D \text{ and } V_B=(Z_B/Z_D)V_D,$$

where $Z_D=Z_A+Z_B$.

Thus, when a bias voltage V is applied between the electrodes 5, 6 of the light modulation medium 1 from the write device 2, partial voltages $V_A$ and $V_B$ are applied respectively to the light modulation layers 8A and 8B and the orientation of cholesteric liquid crystal of the light modulation layer 8A and that of the light modulation layer 8B change according to the partial voltages $V_A$ and $V_B$.

In this embodiment of light modulation medium, the dielectric constant ratio of the light modulation layer 8A and the light modulation layer 8B is made to be not less than 4 in order to optimize the impedance ratio and hence, when voltage $V_D$ is applied to the two light modulation layers put together, the voltages that are applied respectively to the light modulation layer 8A and the light modulation layer 8B show a predetermined partial voltage ratio. Additionally, the ratio of the threshold voltages at which they are respectively moved from a planar state to a focal conic state is selected to be not less than 0.3. Therefore, it is possible to change the electro-optic response of each of the light modulation layers 8A and 8B, while maintaining a predetermined contrast condition, by changing the bias voltage V that is being applied to the electrodes 5, 6 of the light modulation medium 1.

Now, the embodiment of light modulation method to be used for causing the embodiment of light modulation medium to display a color image will be described below.

Figure 7:
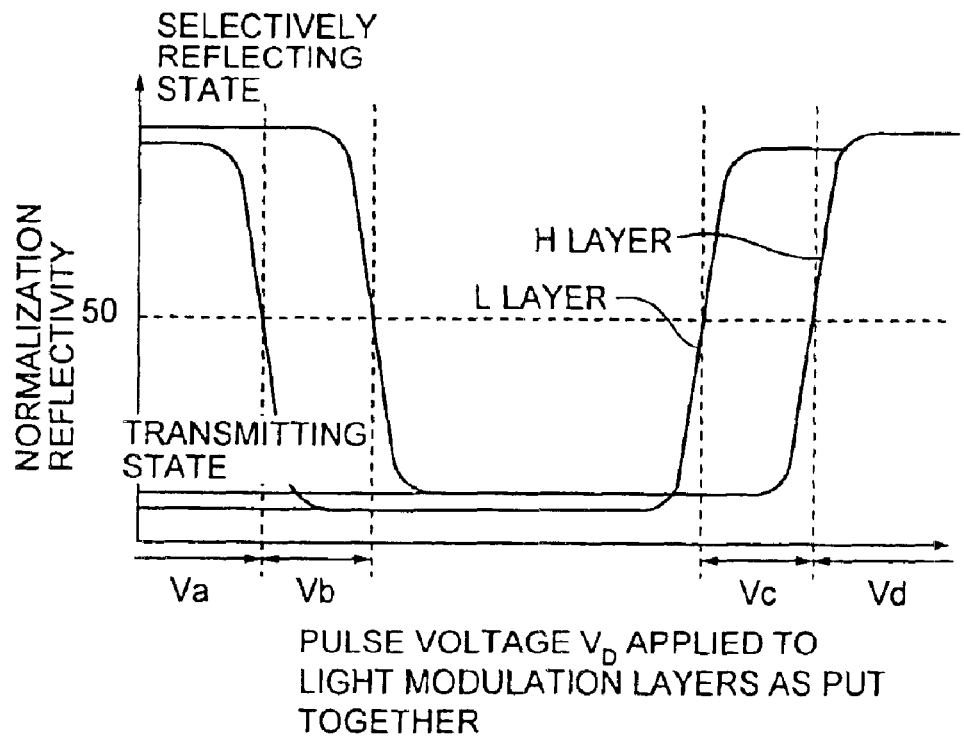
FIG. 7 is a schematic illustration of the electro-optic response of each of the light modulation layers 8A and 8B when a predetermined voltage $V_D$ is applied to the light modulation layers as put together of the light modulation element 1$a$ of the first embodiment.

FIG. 7 is a schematic illustration of the electro-optic response of each of the light modulation layers 8A and 8B when a predetermined voltage $V_D$ is applied to the light modulation layers as put together of the light modulation element 1a.

In FIG. 7, the horizontal axis represents the voltage $V_D$ that is applied to the light modulation layers put together and the vertical axis represents the normalization reflectivity of each of the light modulation layers.

Since the partial voltage ratio and the threshold voltage ratio of the light modulation layers of the light modulation element 1a of this embodiment are controlled so as to show predetermined respective values, the threshold voltages Vpf for moving from a planar state to a focal conic state and the threshold voltages Vfh for moving from a focal conic state to a homeotropic state of the light modulation layers 8A and 8B will be shifted in such a way that the light modulation layers 8A and 8B constantly show the same relationship in terms of their values.

Here, the light modulation layer showing a higher threshold voltage is referred to as H layer while the light modulation layer showing a lower threshold voltage is referred to as L layer. Assume that, when the voltage that is being applied to the light modulation layers as put together is changed, for each of the light modulation layers, the voltage that makes the partial voltage of the L layer not higher than Vpf is Va; and the voltage that puts the partial voltage of the L layer between Vpf and Vfh and makes that of the H layer not higher than Vpf is Vb; while the voltage that puts the partial voltage of the H layer between Vpf and Vfh and makes that of the L layer not lower than Vfh is Vc; and the voltage that makes the partial voltage of the H layer not lower than Vfh is Vd.

As shown in FIG. 8, a bias voltage is applied between the bias electrodes 5, 6 of the light modulation medium 1 from the write device 2 in such a way that the duration of the bias voltage application includes a reset period Tr when AC pulse voltage Vr is applied, a select period Ts when AC pulse voltage Vs is applied and a light modulation period Td when no voltage is applied and a relationship of Vr>Vs is held.

Note here that the frequency of the AC pulse voltage applied to the reset period Tr and that of the AC pulse voltage applied to the select period Ts are not subject to any specific limitations and the AC pulse voltages may be replaced by DC pulse voltages.

FIG. 9 illustrates the voltages that are applied in the reset period Tr and the select period Ts and the electro-optic states of each of the light modulation layers.

Referring to FIG. 9, V1 having a magnitude that makes the voltage $V_D$ being applied to the light modulation layers as put together to be equal to Vc or Vd in FIG. 7 is selected for the AC pulse voltage Vr in the reset period Tr and V2 having a magnitude that makes the voltage $V_D$ being applied to the light modulation layers as put together to be equal to Va or Vb in FIG. 7 is selected for the AC pulse voltage Vs in the select period Ts. For each of the combinations, the H layer and the L layer (the H layer is shown to the left of / whereas the L layer is shown to the right of /) respectively show the orientations as indicated by "◯" and "●" in FIG. 9.

Note that "◯" represents an orientation that selectively reflects light in a planar state and "●" represents an orientation that transmits light in a focal conic state.

As may be obvious from above, with this embodiment of light modulation method according to the invention to be used for the above described embodiment of light modulation medium, it is possible to provide four categories of orientation including;

one in which the H layer and the L layer are in a planar state;

one in which the H layer and the L layer are in a focal conic state;

one in which the H layer is in a planar state and the L layer is in a focal conic state; and one in which the H layer is in a focal conic state and the L layer is in a planar state.

Therefore, as shown in FIG. 10, a light modulation medium may be formed so as to contain an H layer that selectively reflects green (G) light as light modulation layer 8A and an L layer that selectively reflects red (R) right as light modulation layer 8B. Then, by controlling the voltage Vr that is applied in the reset period and the voltage Vs that is applied in the select period from the write device 2, it is possible to display:

yellow (Y) as mixture of green (G) and red (R) by applying voltages Vr=Vd and Vs=Va; and black (K) as the two layers are brought into a state for transmitting light (T) by applying voltages Vr=Vc and Vs=Vb; whereas green (G) by applying voltages Vr=Vd and Vs=Vb; and red (R) by applying voltages Vr=Vc and Vs=Va.

Since four colors can be displayed in a controlled manner, it is possible to display four different colors of yellow, black, green and red in each pixel of a light modulation medium.

(2nd Embodiment)

Figure 12:
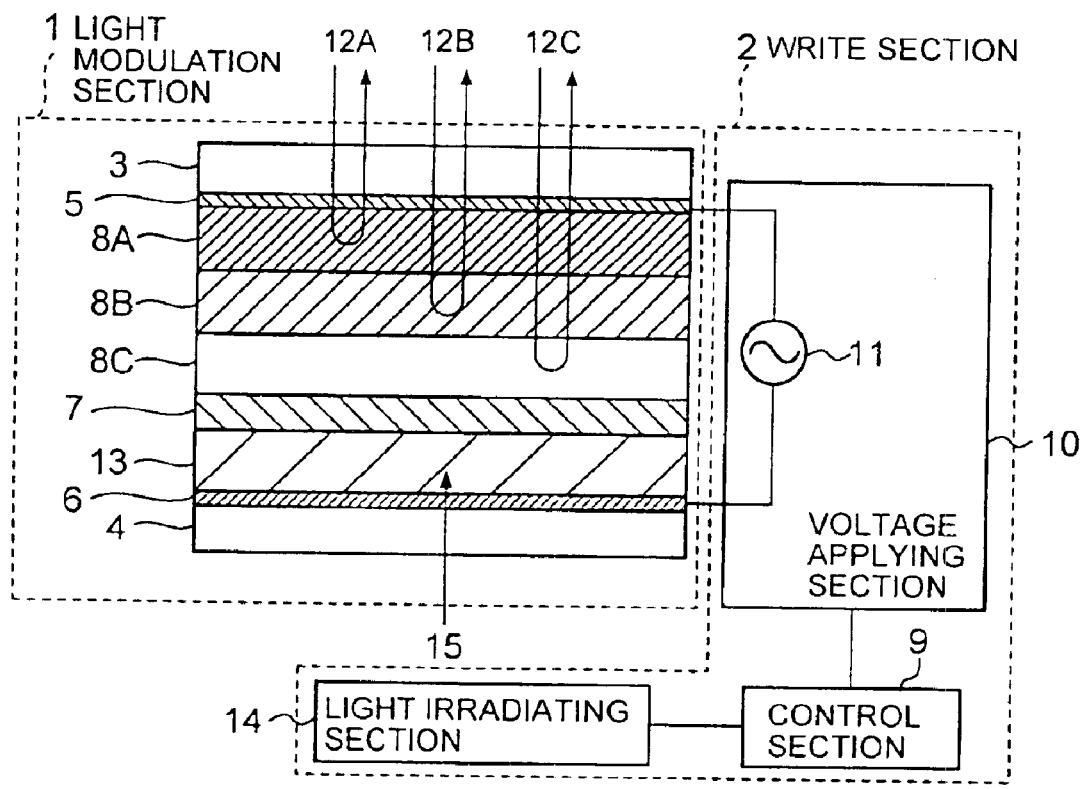
FIG. 12 is a schematic illustration of the second embodiment of light modulation medium and light modulation method along with a write device adapted to be used with the embodiment.

FIG. 12 schematically illustrates the second embodiment of light modulation medium and light modulation method along with a write device adapted to be used with the embodiment.

The light modulation medium 1 of FIG. 12 is formed by a light modulation element 1a that is by turn formed by arranging a light modulation layer 8A adapted to reflect a beam of read light 12A, a light modulation layer 8B adapted to reflect a beam of read light 12B, a light modulation layer 8C adapted to reflect a beam of read light 12C, a light absorption layer 7 and a photoconductive layer 13 between a pair of substrates 3, 4 respectively carrying electrodes 5, 6 that are formed on the inner surfaces thereof. Thus, the light modulation medium 1 has a multilayer structure.

Write device 2 that is used for this embodiment of light modulation method has a voltage applying section 10 that applies a bias voltage 11 between the electrodes 5, 6 of the light modulation medium 1, a light irradiating section 14 for irradiating beams of write light to the photoconductive layer 13 of the optical modulation medium 1 and a control section 9 that controls the voltage applying section 10 and the light irradiating section 14 according to the light modulation pattern to be drawn in the light modulation medium 1, which are laid one on the other to form a multilayer structure.

Although the light modulation medium 1 of this embodiment differs from the first embodiment of light modulation medium in that it has three light modulation layers 8 and additionally a photoconductive layer 13, the two embodiments are otherwise identical and hence only the photoconductive layer 13 will be described below so that the same or similar components will not be described any further.

The photoconductive layer 13 is required only to change its impedance as a function of the rate at which the beam of write light 15 is irradiated. It may be produced either by forming a film of an electric charge generating substance by means of evaporation, sputtering, ion plating or CVD or by dispersing an electric charge generating substance into a polymeric binder and subsequently applying the binder by means of an application technique selected from bar coating, spin coating, roll coating, dipping or casting. Alternatively, it may be formed by laying an electric charge transporting substance or an electric charge transporting layer formed by dispersing an electric charge transporting substance into a polymeric binder on an electric charge generating layer formed by any of the above described techniques. If the electric charge transporting layer has a rectifying effect, electric charge generating layers may be formed on and under it.

Electric charge generating substances that can be used for the purpose of the present invention include inorganic materials such as a-Si, ZnS, ZnO, CdS, CdSe, Se, SeTe, and TiO and organic substances such as phthalocyanine type, azo type, polycyclic quinone type, indigo type, quinacridone type, perylene type, squarium type, azulenium type, cyanine type, pyrylium type and anthrone type organic materials Electric charge transporting substances that can be used for the purpose of the invention include organic materials such as carbazole type, triazole type, oxadiazole type, imidazole type, pyrazoline type, hydrazone type, stilbene type, amine type and nitrofuruorenone type organic materials.

Materials that can be used for the polymeric binder include polycarbonate, polyarylate, polyethylene, polypropylene, polyester, polyvinylacetate, polyvinylbutyral, acryl, methacryl, vinyl chloride, vinyl acetate and copolymers of any of them.

The photoconductive layer 13 of this embodiment of light modulation medium is made to have a light absorbing effect at least relative to the beam of write light 15.

The light irradiating section 14 is only required to irradiate an arbitrary amount of write light 15 to the light modulation section 1. It may be selected from a spontaneous light emitting device such as a laser beam scan device, an LED array, a CRT display, a plasma display or an EL display or a combination of a dimming device such as a liquid crystal shutter and a light source such as a fluorescent tube, a xenon lamp, a halogen lamp, a mercury lamp or an LED lamp, although the present invention is by no means limited thereto.

The light modulation medium of this embodiment has electrodes formed respectively on the inner surfaces of a pair of substrates. However, a light modulation medium according to the invention does not necessarily need to have electrodes. If it does not have any electrodes, it may be so arranged that the write device has a pair of electrodes that sandwich a substrate and a predetermined voltage is applied to the electrodes.

Figure 13:
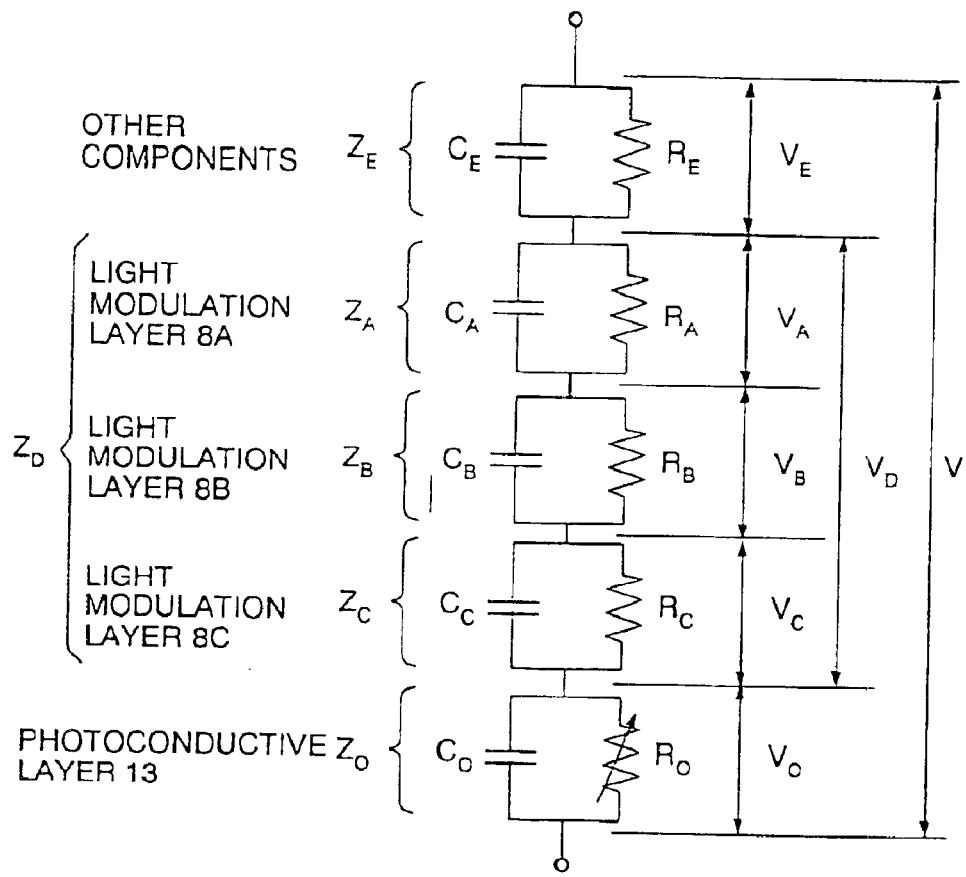
FIG. 13 is a circuit diagram of an equivalent circuit of the second embodiment of light modulation medium.

FIG. 13 is a circuit diagram of an equivalent circuit of this embodiment of light modulation medium.

In FIG. 13, $Z_E$ represents the equivalent impedance of the components other than the light modulation layers 8A, 8B, 8C and the photoconductive layer 13 that is equal to the serial sum of the impedances of the bias electrodes 5, 6 and the light absorption layer 7 of the light modulation medium 1 of FIG. 12. The impedance $Z_E$ can be approximated by means of a parallel circuit of an equivalent electrostatic capacitance $C_E$ and an equivalent resistor $R_E$. In FIG. 13, $V_E$ represents the voltage that is applied to the components other than the light modulation layers 8A, 8B, 8C and the photoconductive layer 13 when a bias voltage V is applied between the bias electrodes 5, 6 of the light modulation medium 1 from the write device 2.

On the other hand, $Z_A$, $Z_B$, $Z_C$ and $Z_D$ respectively represent the impedance of the light modulation layer 8A, that of the light modulation layer 8B, that of the light modulation layer 8C and that of the three light modulation layers put together. The impedances of the light modulation layers can be approximated respectively by means of parallel circuits of electrostatic capacitances $C_A$, $C_B$ and $C_C$ and resistors $R_A$, $R_B$ and $R_C$. In FIG. 13, $V_A$, $V_B$, $V_C$ and $V_D$ represent respectively the voltages that are applied to the light modulation layer 8A, the light modulation layer 8B, the light modulation layer 8C and the three light modulation layers as put together when a bias voltage V is applied between the bias electrodes 5, 6 of the light modulation medium 1 from the write device 2. Since the cholesteric liquid crystal of the light modulation layers shows dielectric constant anisotropy, the impedances $Z_A$, $Z_B$ and $Z_C$ of the light modulation layers change depending on the state of orientation of the liquid crystal.

$Z_O$ represents the impedance of the photoconductive layer 13 that can be approximated by means of a parallel circuit of an electrostatic capacitance $C_O$ and a resistor $R_O$. $V_O$ represents the voltage that is applied to the photoconductive layer 13 when the bias voltage V is applied between the bias electrodes 5, 6 of the light modulation medium 1 from the write device 2.

When the bias voltage V is applied between the electrodes 5, 6 of the light modulation medium 1 from the write device 2, the voltage $V_D$ that is applied to the three light modulation layers as put together is expressed by the equation below;

$$V_D = (Z_D/Z)V,$$

where $Z = Z_E + Z_D + Z_O$.

As the beam of write light 15 is irradiated to the photoconductive layer 13 from the write device 2, movable charge carriers are generated due to the internal photoelectric effect to raise the electric conductivity. Therefore, it is possible to control the voltage $V_D$ that is applied to the three light modulation layers as put together by changing the impedance $Z_O$ of the photoconductive layer 13 by means of the rate at which the beam of write light 15 is irradiated.

On the other hand, when voltage $V_D$ is applied to the three light modulation layers 8A, 8B, 8C as put together, their partial voltages $V_A$, $V_B$ and $V_C$ are expressed by the formulas below;

$$V_A = (Z_A/Z_D)V_D, V_B = (Z_B/Z_D)V_D \text{ and } V_C = (Z_C/Z_D)V_D,$$

where $Z_D = Z_A + Z_B + Z_C$.

Thus, when a bias voltage V is applied between the electrodes 5, 6 of the light modulation medium 1 from the write device 2, partial voltages $V_A$, $V_B$ and $V_C$ are applied respectively to the light modulation layers 8A, 8B and 8C and the orientation of cholesteric liquid crystal of the light modulation layer 8A, that of the light modulation layer 8B and that of the light modulation layer 8C change according to the partial voltages $V_A$, $V_B$ and $V_C$.

Therefore, in this embodiment of light modulation medium, it is possible to make each of the light modulation layers 8A, 8B and 8C show a predetermined electro-optic response on the basis of the bias voltage and the intensity of write light by optimizing the impedance ratio of the components and by controlling the partial voltage ratio of the three light modulation layers due to the bias voltage V applied between the electrodes 5, 6, the partial voltage ratio of the light modulation layers 8A, 8B and 8C produced by the voltage $V_D$ applied to the three light modulation layers as put together and the threshold voltage ratio of the light modulation layers 8A, 8B and 8C relative to the applied partial voltages $V_A$, $V_B$ and $V_C$.

Now, the embodiment of light modulation method to be used for causing the embodiment of light modulation medium to display a color image will be described below.

Figure 14:
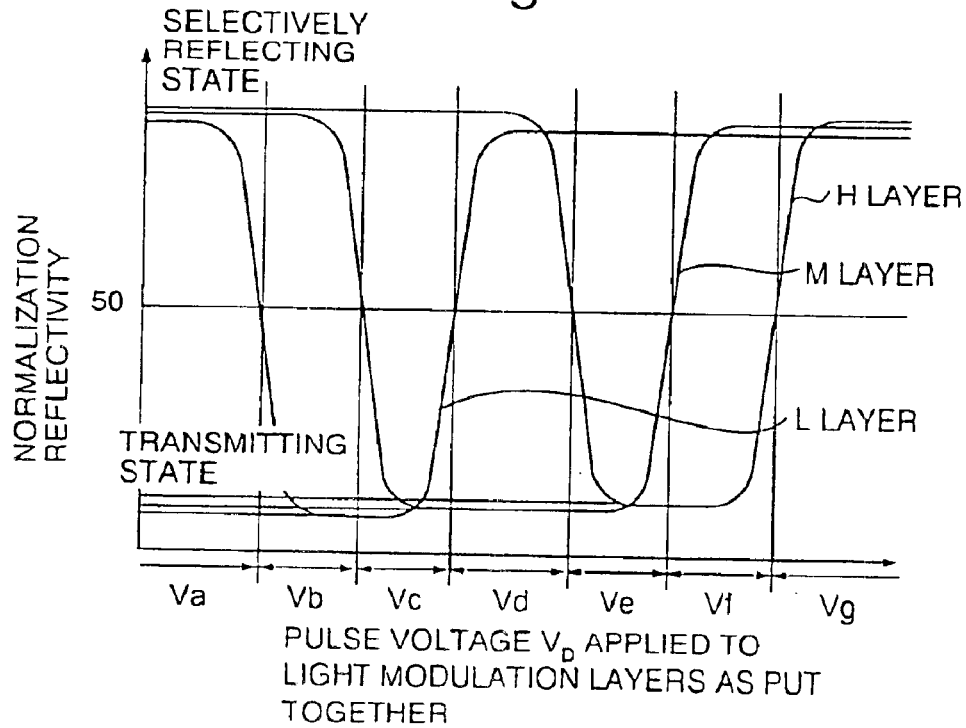
FIG. 14 is a schematic illustration of the electro-optic response of each of the light modulation layers 8A, 8B and 8C when a voltage $V_D$ is applied to the light modulation layers as put together of the second embodiment.

FIG. 14 is a schematic illustration of the electro-optic response of each of the light modulation layers 8A, 8B and 8C when a predetermined voltage $V_D$ is applied to the light modulation layers as put together of the light modulation element.

In FIG. 14, the horizontal axis represents the voltage $V_D$ that is applied to the light modulation layers put together and the vertical axis represents the normalization reflectivity of each of the light modulation layers.

Since the partial voltage ratio and the threshold voltage ratio of the light modulation layers of the light modulation element 1a of this embodiment are controlled so as to show predetermined respective values, the threshold voltages Vpf for moving from a planar state to a focal conic state and the threshold voltages Vfh for moving from a focal conic state to a homeotropic state of the light modulation layers 8A, 8B and 8C will be shifted in such a way that the light modulation layers 8A, 8B and 8C constantly show the same relationship in terms of their values and, if the layer having the highest threshold value, the layer having the medium threshold value and the layer having the lowest threshold value are referred to respectively as H layer, M layer and L layer, the relationship of Vpf of the H layer>Vfh of the L layer is satisfied.

Assume that, when the voltage that is being applied to the light modulation layers as put together is changed, for each of the light modulation layers, the voltage that is being applied to the light modulation layers as put together need to be changed and that:

the voltage that makes the partial voltage of the L layer not higher than Vpf is Va;

the voltage that puts the partial voltage of the L layer between Vpf and Vfh and makes that of the M layer not higher than Vpf is Vb;

the voltage that puts the partial voltage of the M layer between Vpf and Vfh and makes that of the L layer not higher than Vfh is Vc;

the voltage that makes the partial voltage of the L layer not lower than Vfh and that of the H layer not higher than Vpf is Vd;

the voltage that puts the partial voltage of the M layer between Vpf and Vfh and makes that of the H layer not lower than Vpf is Ve;

the voltage that puts the partial voltage of the H layer between Vpf and Vfh and makes that of the M layer not lower than Vfh is Vf; and the voltage that makes the partial voltage of the H layer not lower than Vfh is Vg.

Figure 15A:
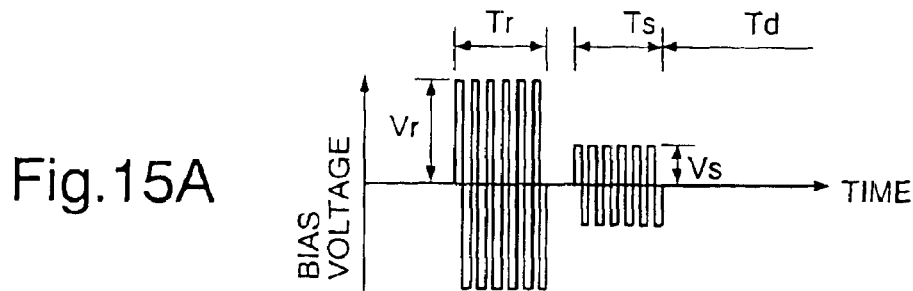
FIGS. 15A and 15B are a schematic illustration of the bias voltage applied between the bias electrodes 5, 6 of the light modulation medium 1 from the write device 2 and the resultant intensity of write light in the periods of Tr and Ts.
Figure 15B:
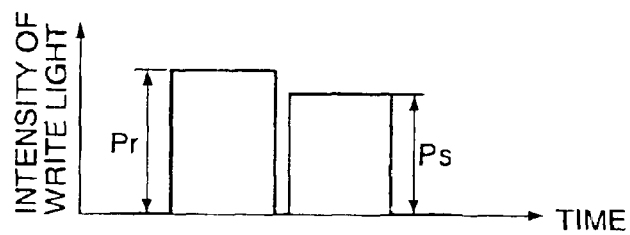

As shown in FIG. 15A, a bias voltage is applied between the bias electrodes 5, 6 of the light modulation medium 1 from the write device 2 in such a way that the duration of the bias voltage application includes a reset period Tr when AC pulse voltage Vr is applied, a select period Ts when AC pulse voltage Vs is applied and a light modulation period Td when no voltage is applied and a relationship of Vr>Vs is held. As shown in FIG. 15B, the first beam of write light is irradiated at a rate of Pr from the light irradiating section 14 so as to cover at least the end of the reset period Tr and the second beam of write light is irradiated at a rate of Ps from the light irradiating section 14 so as to cover at least the end of the select period Ts.

Note here that the frequency of the AC pulse voltage applied to the reset period Tr and that of the AC pulse voltage applied to the select period Ts are not subject to any specific limitations and the AC pulse voltages may be replaced by DC pulse voltages if the photoconductive layer 13 of the light modulation medium 1 is monopolar.

Figure 16:
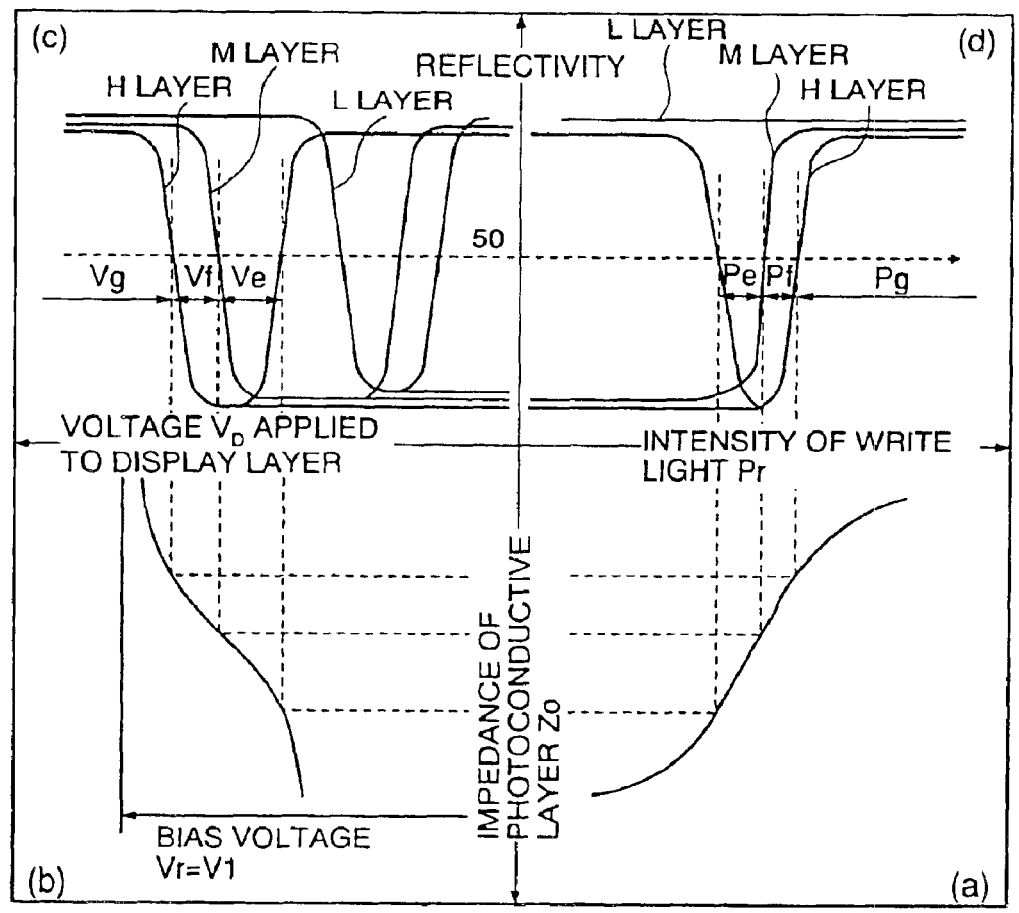
FIG. 16 is a schematic illustration of the electro-optic responses of the H layer, the M layer and the L layer relative to the bias voltage Vr and the intensity Pr of write light in the reset period Tr.

FIG. 16 illustrates the electro-optic responses of the H layer, the M layer and the L layer relative to the bias voltage Vr and the intensity Pr of write light in the reset period Tr.

In FIG. 16, part (a) of FIG. 16 shows a graph illustrating the relationship between the intensity Pr of write light and the impedance $Z_O$ of the photoconductive layer and part (b) of FIG. 16 shows a graph illustrating the relationship between the impedance $Z_O$ of the photoconductive layer and the voltage $V_D$ applied to the light modulation layers as put together, whereas part (c) of FIG. 16 shows a graph illustrating the reflectivity of the H layer, that of the M layer and that of the L layer relative to the voltage $V_D$ applied to the light modulation layers as put together and part (d) of FIG. 16 shows a graph illustrating the reflectivity of the H layer, that of the M layer and that of the L layer relative to the intensity Pr of write light 15 irradiated to the light modulation medium 1 from the light irradiating section 14.

Figures 17, 18:
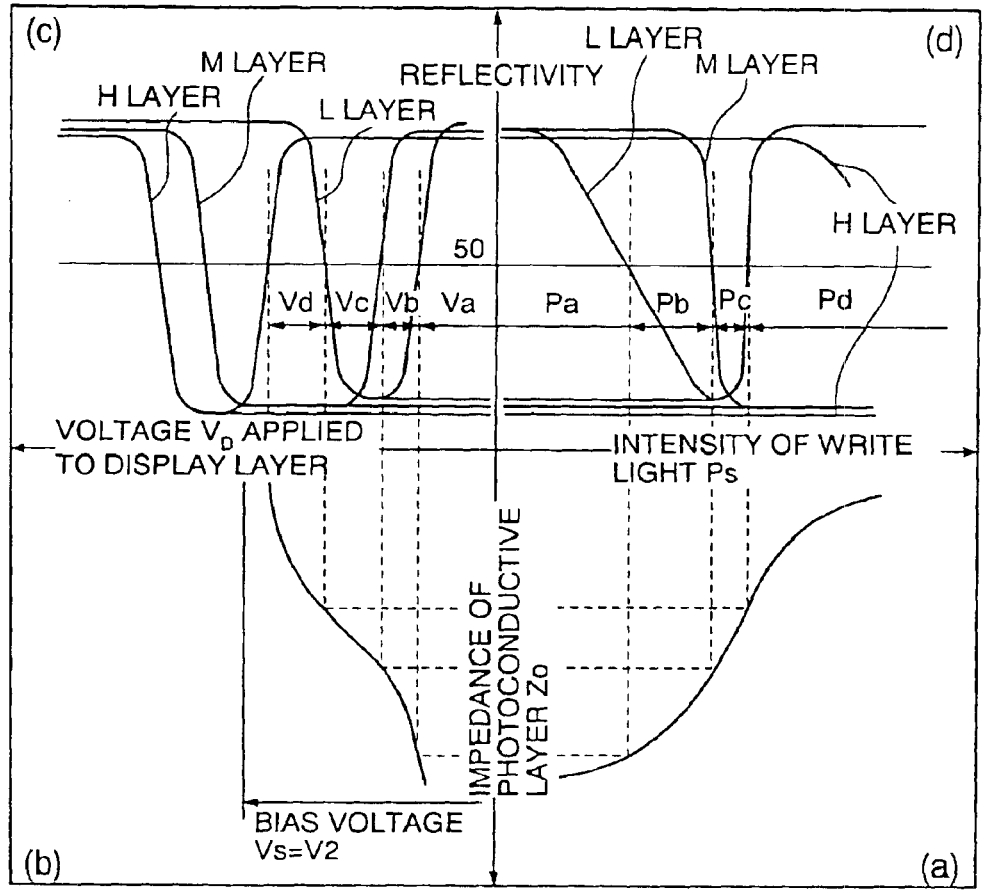
FIG. 17 is a schematic illustration of the electro-optic responses of the H layer, the M layer and the L layer relative to the bias voltage Vs and the intensity Ps of write light in the select period Ts.
FIG. 18 is a schematic illustration of the voltages that are applied in the reset period Tr and the select period Ts and the electro-optic states of each of the light modulation layers of the second embodiment.

FIG. 17 shows the electro-optic responses of the H layer, the M layer and the L layer relative to the bias voltage Vs and the intensity Ps of write light in the select period Ts.

In FIG. 17, part (a) of FIG. 17 shows a graph illustrating the relationship between the intensity Ps of write light and the impedance $Z_O$ of the photoconductive layer and part (b) of FIG. 17 shows a graph illustrating the relationship between the impedance $Z_O$ of the photoconductive layer and the voltage $V_D$ applied to the light modulation layers as put together, whereas part (c) of FIG. 17 shows a graph illustrating the reflectivity of the H layer, that of the M layer and that of the L layer relative to the voltage $V_D$ applied to the light modulation layers as put together and part (d) of FIG. 17 shows a graph illustrating the reflectivity of the H layer, that of the M layer and that of the L layer relative to the intensity Ps of write light 15 irradiated to the light modulation medium 1 from the light irradiating section 14.

FIG. 18 illustrates the voltages that are applied in the reset period Tr and the select period Ts and the electro-optic states of each of the light modulation layers.

Referring to FIG. 18, V1 having a magnitude that makes the voltage $V_D$ being applied to the light modulation layers as put together to be equal to Ve, Vf or Vg in FIG. 14 is selected for the bias voltage Vr and the intensity Pr of write light is selected so as to be equal to Pe, Pf or Pg and used for irradiation in the reset period Tr. On the other hand, V2 having a magnitude that makes the voltage $V_D$ being applied to the light modulation layers as put together to be equal to Va, Vb, Vc or Vd in FIG. 14 is selected for the bias voltage Vs and the intensity Ps of write light is selected so as to be equal to Pa, Pb, Pc or Pd and used for irradiation in the select period Ts.

For each of the combinations, the H layer, the M layer and the L layer (as shown from the left in each block in FIG. 18) respectively show the orientations as indicated by "◯" and "●" in FIG. 18.

Note that "◯" represents an orientation that selectively reflects light in a planar state and "●" represents an orientation that transmits light in a focal conic state.

As may be obvious from above, with this embodiment of light modulation method according to the invention to be used for the above described embodiment of light modulation medium, it is possible to provide eight categories of orientation including:

one in which the H layer, the M layer and the L layer are all in a planar state;

one in which the H layer, the M layer and the L layer are all in a focal conic state;

one in which the H layer is in a planar state while the M layer and the L layer are in a focal conic state;

one in which the M layer is in a planar state while the H layer and the L layer are in a focal conic state;

one in which the L layer is in a planar state while the H layer and the M layer are in a focal conic state;

one in which the H layer and the M layer are in a planar state while the L layer is in a focal conic state;

one in which the M layer and the L layer are in a planar state while the H layer is in a focal conic state; and one in which the H layer and the L layer are in a planar state while the M layer is in a focal conic state.

Figure 19:
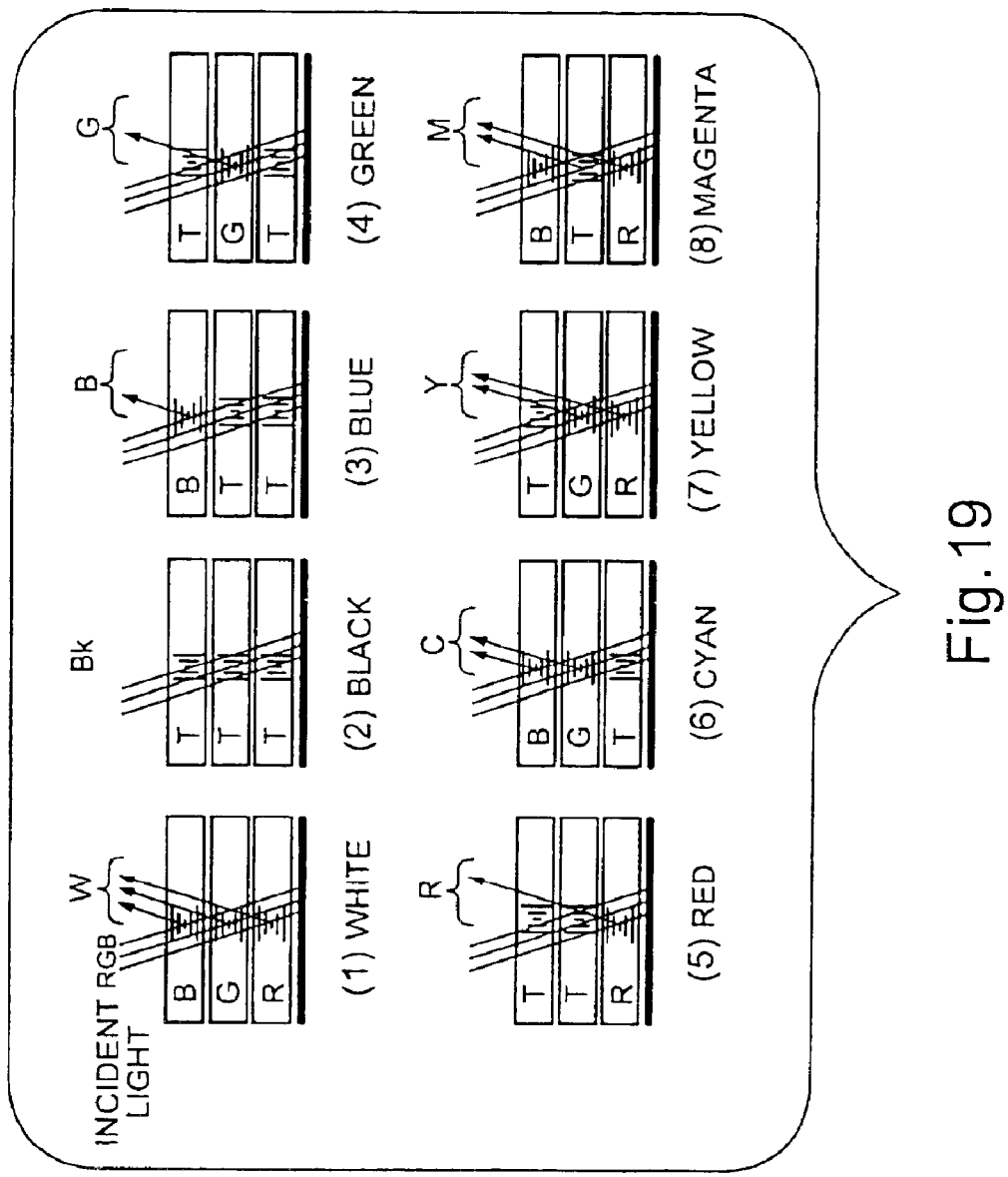
FIG. 19 is a schematic illustration of light modulation displays by the second embodiment of light modulation medium.

Therefore, as shown in FIG. 19, a light modulation medium may be formed so as to contain an H layer that selectively reflects blue (B) light as light modulation layer 8A, an M layer that selectively reflects green (G) light as light modulation layer 8B and an L layer that selectively reflects red (R) right as light modulation layer 8C. Then, by controlling the bias voltage Vr and Vs and the intensity Pr of write light from the write device 2, it is possible to produce:

(1) a state of displaying white (W) as a result of mixing red (R), green (G) and blue (B) that are displayed respectively in the light modulation layers by applying bias voltages of Vr=V1, Pr=Pg, Vs=V2 and Ps=Pa;

(2) a state of displaying black (K) as a result of a light transmitting condition (T) of the light modulation layers produced by applying bias voltages of Vr=V1, Pr=Pe, Vs=V2 and Ps=Pc;

(3) a state of displaying blue (B) by applying bias voltages of Vr=V1, Pr=Pg, Vs=V2 and Ps=Pc;

(4) a state of displaying green (G) by applying bias voltages of Vr=V1, Pr=Pf, Vs=V2 and Ps=Pb;

(5) a state of displaying red (R) by applying bias voltages of Vr=V1, Pr=Pe, Vs=V2 and Ps=Pa;

(6) a state of displaying cyan (C) as a result of mixing blue (B) and green (G) that are obtained by applying bias voltages of Vr=V1, Pr=Pg, Vs=V2 and Ps=Pb;

(7) a state of displaying yellow (Y) as a result of mixing green (G) and red (R) that are obtained by applying bias voltages of Vr=V1, Pr=Pf, Vs=V2 and Ps=Pa; and (8) a state of displaying magenta (M) as a result of mixing blue (B) and red (R) that are obtained by applying bias voltages of Vr=V1, Pr=Pg, Vs=V2 and Ps=Pd.

Since eight colors can be displayed in a controlled manner, it is possible to display eight different colors of white, black, blue, green, red, cyan, yellow and magenta in each pixel of a light modulation medium.

(3rd Embodiment)

Figure 20:
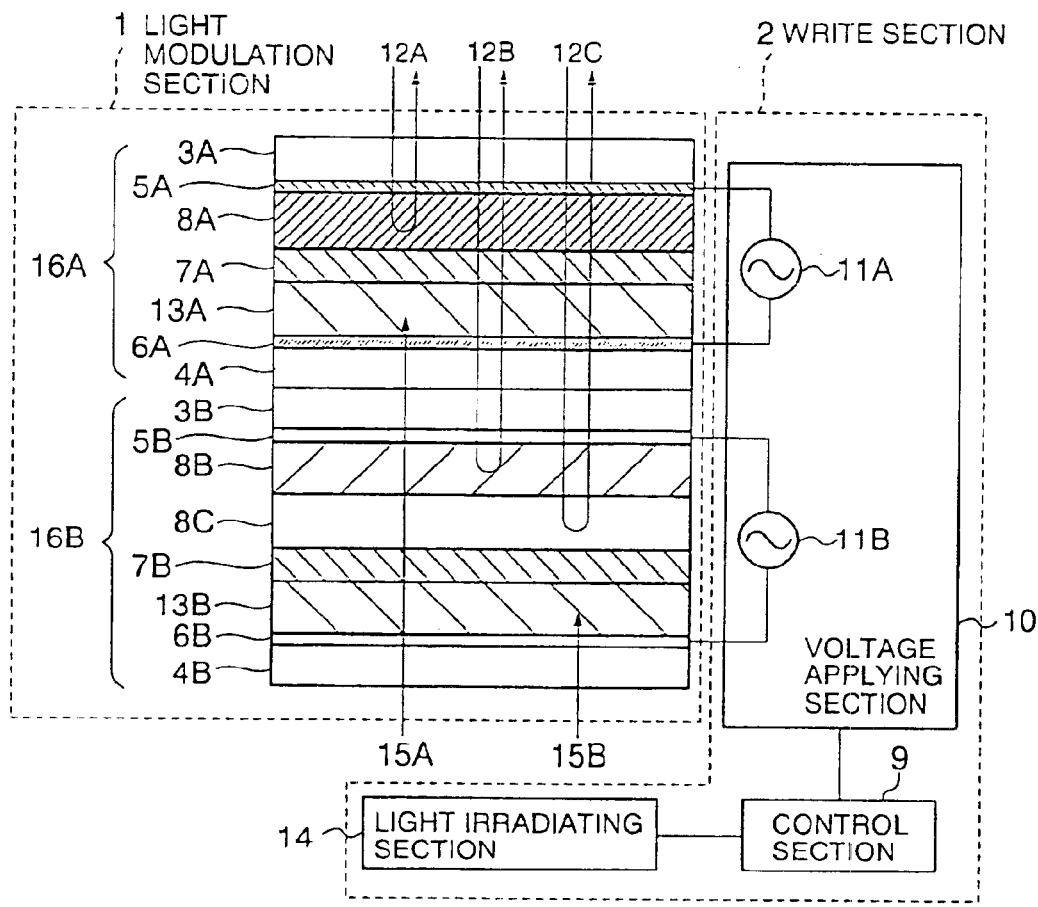
FIG. 20 is a schematic illustration of the third embodiment of light modulation medium and light modulation method along with a write device adapted to be used with the embodiment.

FIG. 20 schematically illustrates the third embodiment of light modulation medium and light modulation method along with a write device adapted to be used with the embodiment.

The light modulation medium 1 of FIG. 20 has two light modulation elements 16A and 16B. The light modulation element 16A is formed by arranging a light modulation layer 8A adapted to reflect a beam of read light 12A, a light absorption layer 7A and a photoconductive layer 13A between a pair of substrates 3A, 4A respectively carrying bias electrodes 5A, 6A that are formed on the inner surfaces thereof. On the other hand, the light modulation element 16B is formed by arranging a light modulation layer 8B adapted to reflect a beam of read light 12B, a light modulation layer 8C adapted to reflect a beam of read light 12C, a light absorption layer 7B and a photoconductive layer 13B between a pair of substrates 3B, 4B respectively carrying electrodes 5B, 6B that are formed on the inner surfaces thereof. Thus, the light modulation medium 1 has a multilayer structure.

A write device 2 that is used for this embodiment of light modulation method has a voltage applying section 10 that applies a bias voltage 11A between the electrodes 5A, 6A of the light modulation element 16A and also applies a bias voltage 11B between the bias electrodes 5B, 6B of the light modulation element 16B, a light irradiating section 14 for irradiating a beam of write light 15A to the photoconductive layer 13A of the optical modulation element 16A and also irradiating a beam of write light 15B to the photoconductive layer 13B of the light modulation element 16B and a control section 9 that controls the voltage applying section 10 and the light irradiating section 14 according to the light modulation pattern.

Although the light modulation medium 1 of this embodiment differs from the first embodiment of light modulation medium in that it has two light modulation elements and each of the light modulation elements has a photoconductive layer laid in it, the two embodiments are otherwise identical and hence this embodiment will be described only in terms of the differences below.

In this embodiment, the photoconductive layer 13A is required only to at least absorb the beam of write light 15A and transmit the beams of read light 12B, 12C, whereas the photoconductive layer 13B is required only to absorb the beam of write light 15B and transmit the beam of write light 15A.

The light irradiating section 14 is only required to irradiate beams of write light 15A, 15B to the light modulation section 1 at an appropriate rate. It may be selected from a spontaneous light emitting device such as a laser beam scan device, an LED array, a CRT display, a plasma display or an EL display or a combination of a dimming device such as a liquid crystal shutter and a light source such as a fluorescent tube, a xenon lamp, a halogen lamp, a mercury lamp or an LED lamp, although the present invention is by no means limited thereto.

While the light modulation medium of this embodiment has two light modulation elements, the number of light modulation elements is by no means limited to two. Additionally, while one of the light modulation elements has only a single light modulation layer, it may alternatively has plural light modulation layers.

Figure 21:
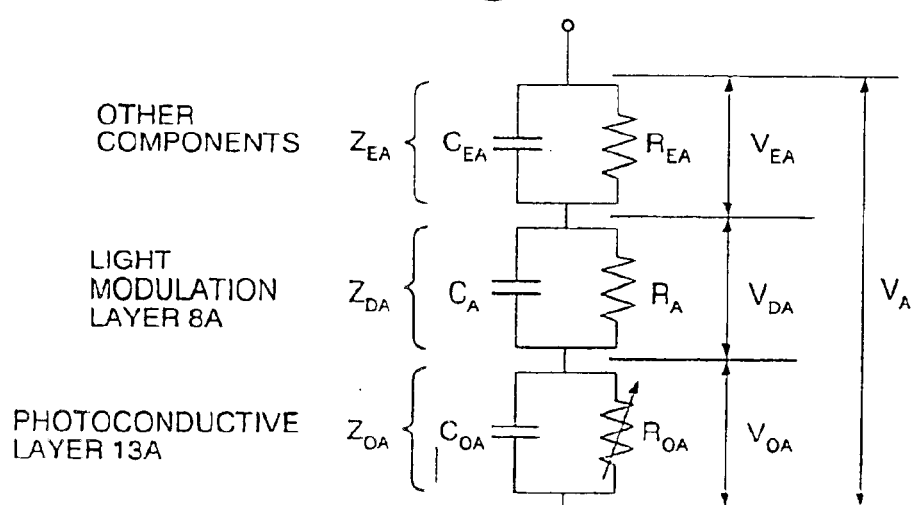
FIG. 21 is a circuit diagram of an equivalent circuit of the light modulation element 16A of the third embodiment.

FIG. 21 is a circuit diagram of an equivalent circuit of the light modulation element 16A of this embodiment of light modulation medium.

In FIG. 21, $Z_{EA}$ represents the equivalent impedance of the components other than the light modulation layer 8A and the photoconductive layer 13A. $Z_{EA}$ is equal to the serial sum of the impedances of the electrodes 5A, 6A and the light absorption layer 7A shown in FIG. 20 and can be approximated by means of a parallel circuit of an equivalent electrostatic capacitance $C_{EA}$ and an equivalent resistor $R_{EA}$. In FIG. 21, $V_{EA}$ represents the voltage that is applied to the components other than the light modulation layer 8A and the photoconductive layer 13A when a bias voltage $V_A$ is applied between the bias electrodes 5A, 6A of the light modulation element 16A from the write device 2.

On the other hand, $Z_{DA}$ represents the impedance of the light modulation layer 8A. It can be approximated by means of a parallel circuit of an electrostatic capacitance $C_A$ and a resistor $R_A$. In FIG. 21, $V_{DA}$ represents the voltage that is applied to the light modulation layer 8A when a bias voltage $V_A$ is applied between the bias electrodes 5A, 6A of the light modulation element 16A from the write device 2. Since the cholesteric liquid crystal of the light modulation layer shows dielectric constant anisotropy, the impedance $Z_{DA}$ of the light modulation layer changes depending on the state of orientation of the liquid crystal.

$Z_{OA}$ represents the impedance of the photoconductive layer 13A that can be approximated by means of a parallel circuit of an electrostatic capacitance $C_{OA}$ and a resistor $R_{OA}$. $V_{OA}$ represents the voltage that is applied to the photoconductive layer 13A when the bias voltage $V_A$ is applied between the bias electrodes 5A, 6A of the light modulation element 16A from the write device 2.

When the bias voltage $V_A$ is applied between the electrodes 5A, 6A of the light modulation element 16A from the write device 2, the voltage $V_{DA}$ that is applied to the light modulation layer 8A is expressed by the equation below;

$$V_{DA}(Z_{DA}/Z_A)V_A,$$

where $Z_A = Z_{EA} + Z_{DA} + Z_{OA}$.

As the beam of write light 15A is irradiated to the photoconductive layer 13A from the write device 2, movable charge carriers are generated due to the internal photoelectric effect to raise the electric conductivity of the photoconductive layer 13A. Therefore, it is possible to control the voltage $V_{DA}$ that is applied to the light modulation layer 8A by changing the impedance $Z_{OA}$ of the photoconductive layer 13A by means of the rate at which the beam of write light 15A is irradiated. Then, the state of orientation of the cholesteric liquid crystal of the light modulation layer 8A changes according to the voltage $V_{DA}$.

Figure 24A:
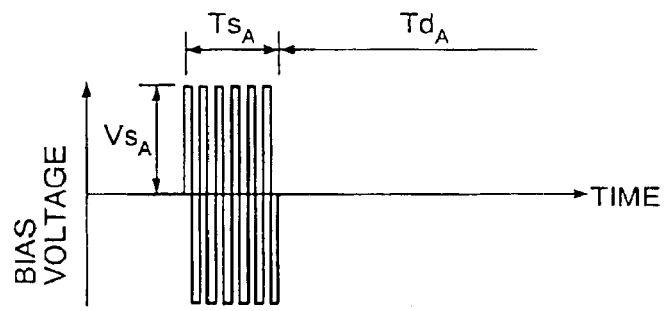
FIGS. 24A and 24B are a schematic illustration of the bias voltage $Vs_A$ applied and the resultant intensity $Ps_A$ of write light of the third embodiment.
Figure 24B:
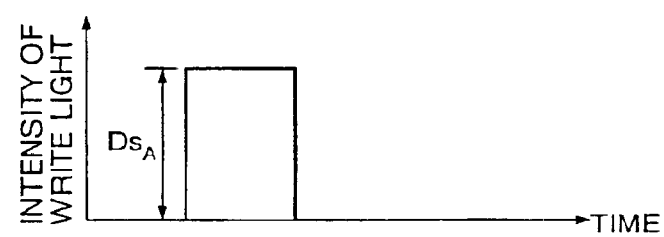
Figure 26:
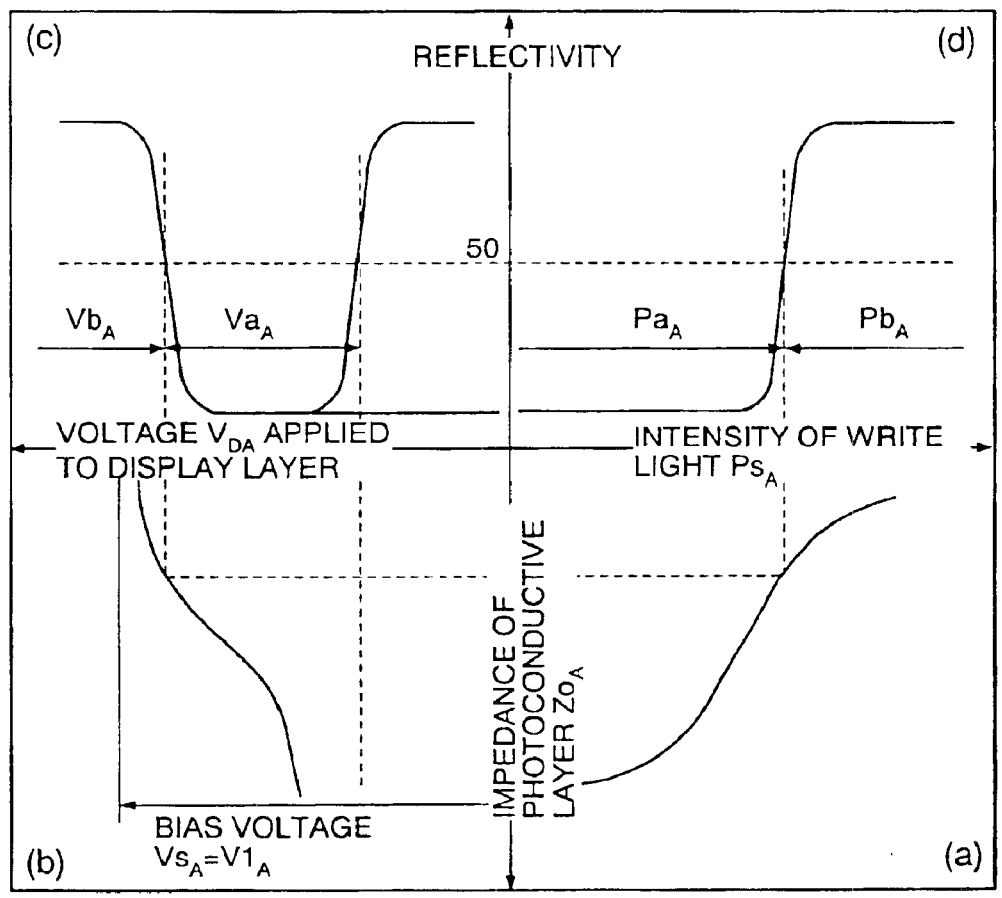
FIG. 26 is a schematic illustration of the electro-optic responses of the light modulation layer 8A relative to the bias voltage and the intensity of write light.

FIG. 26 illustrates the electro-optic responses of the light modulation layer 8A relative to the bias voltage and the intensity of write light. More specifically, it shows the state of the light modulation layer 8A when bias voltage $Vs_A$ is applied and write light is irradiated at rate $Ps_A$ in the select period $Ts_A$ as shown in FIGS. 24A and 24B.

In FIG. 26, par (a) of FIG. 26 shows a graph illustrating the relationship between the intensity $Ps_A$ of write light and the impedance $Z_{OA}$ of the photoconductive layer and part (b) of FIG. 26 shows a graph illustrating the relationship between the impedance $Z_{OA}$ of the photoconductive layer and the voltage $V_{DA}$ applied to the light modulation layer 8A, whereas part (c) of FIG. 26 shows a graph illustrating the reflectivity of the light modulation element 16A relative to the voltage $V_{DA}$ applied to the light modulation layer 8A and part (d) of FIG. 26 shows a graph illustrating the reflectivity of the light modulation element 16A relative to the intensity $Ps_A$ of write light 15 irradiated to the light modulation element 16A from the light irradiating section 14.

Two states of orientation including a planar state and a focal conic state can be obtained for the light modulation layer 8A when a voltage value of $V1_A$ and a pair of intensity values of $Pa_A$ and $Pb_A$ are selected respectively for the bias voltage $Vs_A$ and the intensity of write light $Ps_A$ in the select period $Ts_A$ so that the voltage $V_{DA}$ that is applied to the light modulation element 16A becomes equal to $Va_A$, $Vb_A$.

Figure 22:
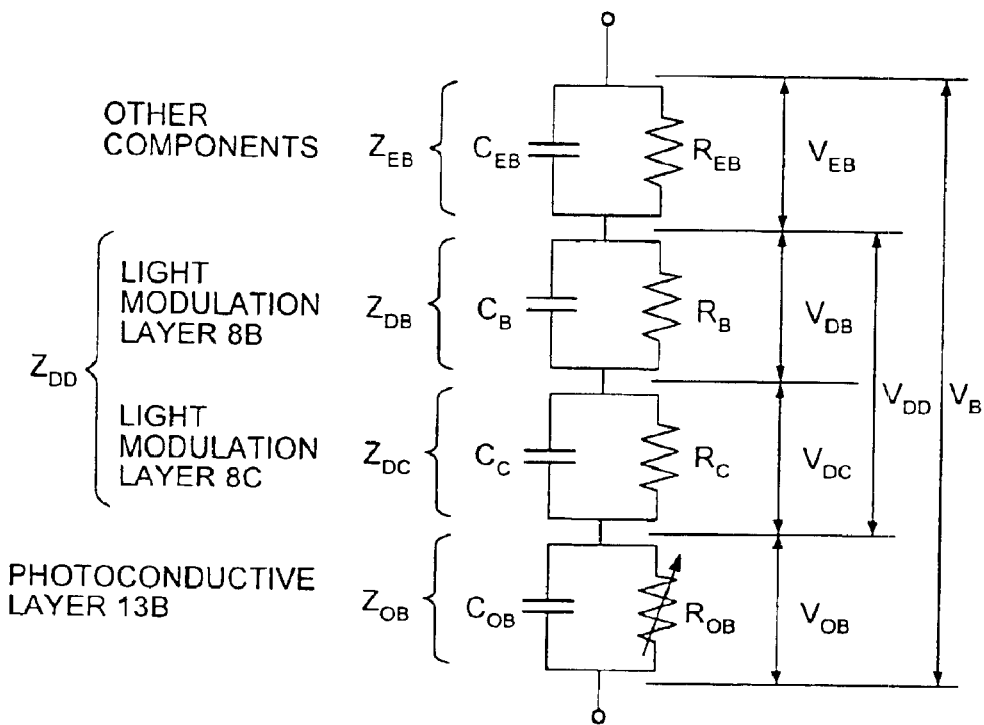
FIG. 22 is a circuit diagram of an equivalent circuit of the light modulation element 16B of the third embodiment.

FIG. 22 is a circuit diagram of an equivalent circuit of the light modulation element 16B.

In FIG. 22, $Z_{EB}$ represents the equivalent impedance of the components other than the light modulation layers 8B, 8C and the photoconductive layer 13B. $Z_{EB}$ is equal to the serial sum of the impedances of the electrodes 5B, 6B and the light absorption layer 7B and can be approximated by means of a parallel circuit of an equivalent electrostatic capacitance $C_{EB}$ and an equivalent resistor $R_{EB}$. In FIG. 22, $V_{EB}$ represents the voltage that is applied to the components other than the light modulation layers 8B, 8C and the photoconductive layer 13B when a bias voltage $V_B$ is applied between the bias electrodes 5B, 6B of the light modulation element 16B from the write device 2.

On the other hand, $Z_{DB}$, $Z_{DC}$ and $Z_{DD}$ represent respectively the impedance of the light modulation layer 8B, that of the light modulation layer 8C and that of the entire light modulation element 16B. The light modulation layers can be approximated respectively by means of parallel circuits of electrostatic capacitance $C_B$, $C_C$ and resistors $R_B$, $R_C$. In FIG. 22, $V_{DB}$, $V_{DC}$ and $V_{DD}$ represent respectively the voltages that are applied to the light modulation layer 8B, the light modulation layer 8C and the light modulation element 16B when a bias voltage $V_B$ is applied between the electrodes 5B, 6B of the light modulation element 16B from the write device 2. Since the cholesteric liquid crystal of the light modulation layers shows dielectric constant anisotropy, the impedances $Z_{DB}$, $Z_{DC}$ of the light modulation layers change depending on the state of orientation of the liquid crystal.

$Z_{OB}$ represents the impedance of the photoconductive layer 13B that can be approximated by means of a parallel circuit of an equivalent electrostatic capacitance $C_{OB}$ and a resistor $R_{OB}$. $V_{OB}$ represents the voltage that is applied to the photoconductive layer 13B when the bias voltage $V_B$ is applied between the bias electrodes 5B, 6B of the light modulation element 16B from the write device 2.

When the bias voltage $V_B$ is applied between the electrodes 5B, 6B of the light modulation element 16B from the write device 2, the voltage $V_{DD}$ that is applied to all the light modulation layers of the light modulation element 16B is expressed by the equation below;

$$V_{DD}=(Z_{DD}/Z_B)V_B,$$

where $Z_B=Z_{EB}+Z_{DD}+Z_{OB}$.

As the beam of write light 15B is irradiated to the photoconductive layer 13B from the write device 2, movable charge carriers are generated due to the internal photoelectric effect to raise the electric conductivity of the photoconductive layer 13B. Therefore, it is possible to control the voltage $V_{DD}$ that is applied to all the light modulation layers of the light modulation element 16B by changing the impedance $Z_{OB}$ of the photoconductive layer 13B by means of the rate at which the beam of write light 15B is irradiated.

On the other hand, when voltage $V_{DD}$ is applied to all the light modulation layers of the light modulation element 16B, the voltages $V_{DB}$ and $V_{DC}$ applied respectively to the light modulation layer 8B and 8C are expressed by the following equations;

$$V_{DB}(Z_{DB}/Z_{DD})V_{DD} \text{ and } V_{DC}=(Z_{DC}/Z_{DD})V_{DD},$$

where $Z_{DD}=Z_{DB}+Z_{DC}$.

Thus, when a bias voltage $V_B$ is applied between the electrodes 5B, 6B of the light modulation element 16B and a beam of write light 15B is irradiated from the write device 2, partial voltages $V_{DB}$ and $V_{DC}$ attributable to the impedance are applied respectively to the light modulation layers 8B and 8C and the orientation of cholesteric liquid crystal of the light modulation layer 8B and that of the light modulation layer 8C change according to the partial voltages $V_{DB}$ and $V_{DC}$.

Therefore, in this embodiment of light modulation medium, it is possible to move each of the light modulation layers 8B and 8C to a predetermined state by optimizing the impedance ratio of the components of the light modulation element 16B and by controlling the partial voltage ratio of all the light modulation layers of the light modulation element 16B due to the bias voltage $V_B$ applied between the electrodes 5B, 6B, the partial voltage ratio of the light modulation layers 8B and 8C produced by the voltage $V_{DD}$ applied to all the light modulation layers of the light modulation element 16B and the electro-optic responses of the light modulation layers 8B and 8C relative to the voltages $V_{DB}$ and $V_{DC}$ applied respectively to them.

Now, the embodiment of light modulation method to be used for causing the embodiment of light modulation medium to display a color image will be described below.

Figure 23:
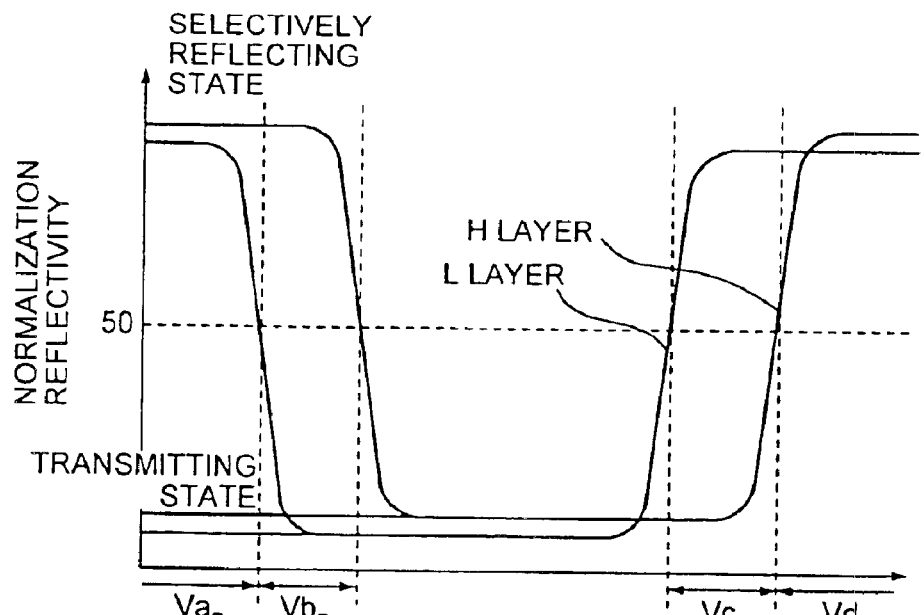
FIG. 23 is a schematic illustration of the electro-optic response of each of the light modulation layers 8B and 8C of the light modulation element 16B when a predetermined voltage $V_{DD}$ is applied to all the light modulation layers as put together of the light modulation element 16B.

FIG. 23 is a schematic illustration of the electro-optic response of each of the light modulation layers 8B and 8C of the light modulation element 16B when a predetermined voltage $V_{DD}$ is applied to all the light modulation layers as put together of the light modulation element 16B.

In FIG. 23, the horizontal axis represents the voltage $V_{DD}$ that is applied to the light modulation layers as put together and the vertical axis represents the normalization reflectivity of each of the light modulation layers.

Since the partial voltage ratio and the threshold voltage ratio of the light modulation layers 8B, 8C of the light modulation element 16B of this embodiment are controlled so as to show predetermined respective values, the threshold voltages Vpf for moving from a planar state to a focal conic state and the threshold voltages Vfh for moving from a focal conic state to a homeotropic state of the light modulation layers 8B and 8C will be shifted in such a way that the light modulation layers 8B and 8C constantly show the same relationship in terms of their values.

Here, the light modulation layer showing a higher threshold voltage is referred to as H layer while the light modulation layer showing a lower threshold voltage is referred to as L layer. Assume that, when the voltage $V_{DD}$ that is being applied to the light modulation layers as put together is changed, for each of the light modulation layers, the voltage that makes the partial voltage of the L layer not higher than Vpf is $Va_B$; and the voltage that puts the partial voltage of the L layer between Vpf and Vfh and makes that of the H layer not higher than Vpf is $Vb_B$; while the voltage that puts the partial voltage of the H layer between Vpf and Vfh and makes that of the L layer not lower than Vfh is $Vc_B$; and the voltage that makes the partial voltage of the H layer not lower than Vfh is $Vd_B$.

Figure 25A:
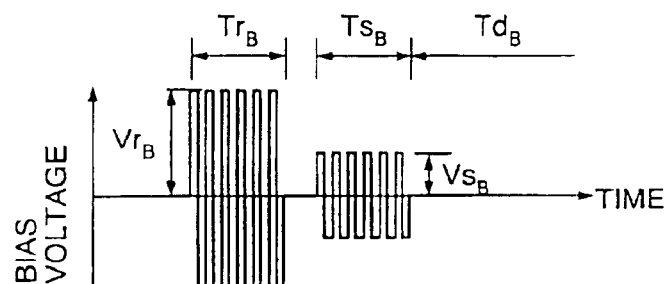
FIGS. 25A and 25B are a schematic illustration of the bias voltage applied and the resultant intensity of write light of the third embodiment.
Figure 25B:
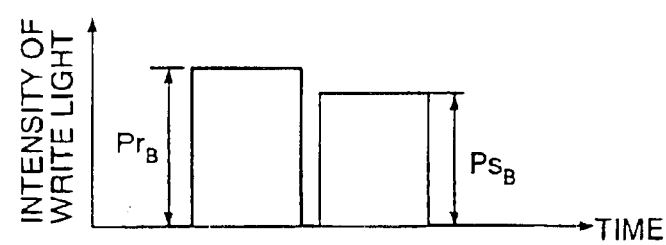

As shown in FIG. 25A, a bias voltage is applied between the bias electrodes 5B, 6B of the light modulation element 16B from the write device 2 in such a way that the duration of the bias voltage application includes a reset period $Tr_B$ when AC pulse voltage $Vr_B$ is applied, a select period $Ts_B$ when AC pulse voltage $Vs_B$ is applied and a light modulation period $Td_B$ when no voltage is applied and a relationship of $Vr_B > Vs_B$ is held. As shown in FIG. 25B, the first beam of write light is irradiated at a rate of $Pr_B$ from the light irradiating section 14 so as to cover at least the end of the reset period $Tr_B$ and the second beam of write light is irradiated at a rate of $Ps_B$ from the light irradiating section 14 so as to cover at least the end of the select period $Ts_B$. Note here that the frequency of the bias voltage applied to the reset period $Tr_B$ and that of the bias voltage applied to the select period $Ts_B$ are not subject to any specific limitations and the bias voltages may preferably be replaced by DC pulse voltages if the photoconductive layer 13B of the light modulation section 1 is monopolar.

Figure 27:
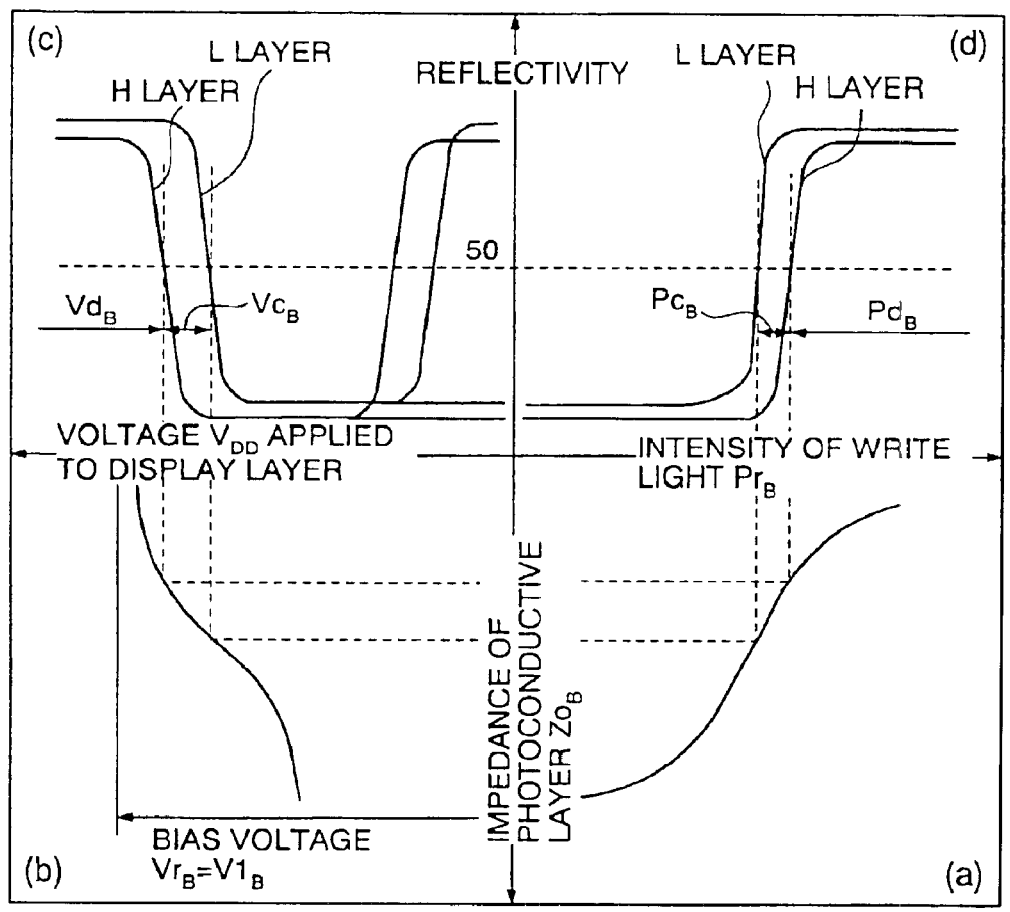
FIG. 27 is a schematic illustration of the electro-optic responses of the H layer and the L layer relative to the bias voltage $Vr_B$ and the intensity $Pr_B$ of write light in the reset period $Tr_B$.

FIG. 27 illustrates the electro-optic responses of the H layer and the L layer relative to the bias voltage $Vr_B$ and the intensity $Pr_B$ of write light in the reset period $Tr_B$.

In FIG. 27, part (a) of FIG. 27 shows a graph illustrating the relationship between the intensity $Pr_B$ of write light and the impedance $Z_{OB}$ of the photoconductive layer and part (b) of FIG. 27 shows a graph illustrating the relationship between the impedance $Z_{OB}$ of the photoconductive layer and the voltage $V_{DD}$ applied to the light modulation layers as put together of the light modulation element 16B, whereas part (c) of FIG. 27 shows a graph illustrating the reflectivity of the H layer and that of the L layer relative to the voltage $V_{DD}$ applied to the light modulation layers as put together of the light modulation element 16B and part (d) of FIG. 27 shows a graph illustrating the reflectivity of the H layer and that of the L layer relative to the intensity $Pr_B$ of write light 15 irradiated to the light modulation section 1 from the light irradiating section 14.

Figures 28, 29:
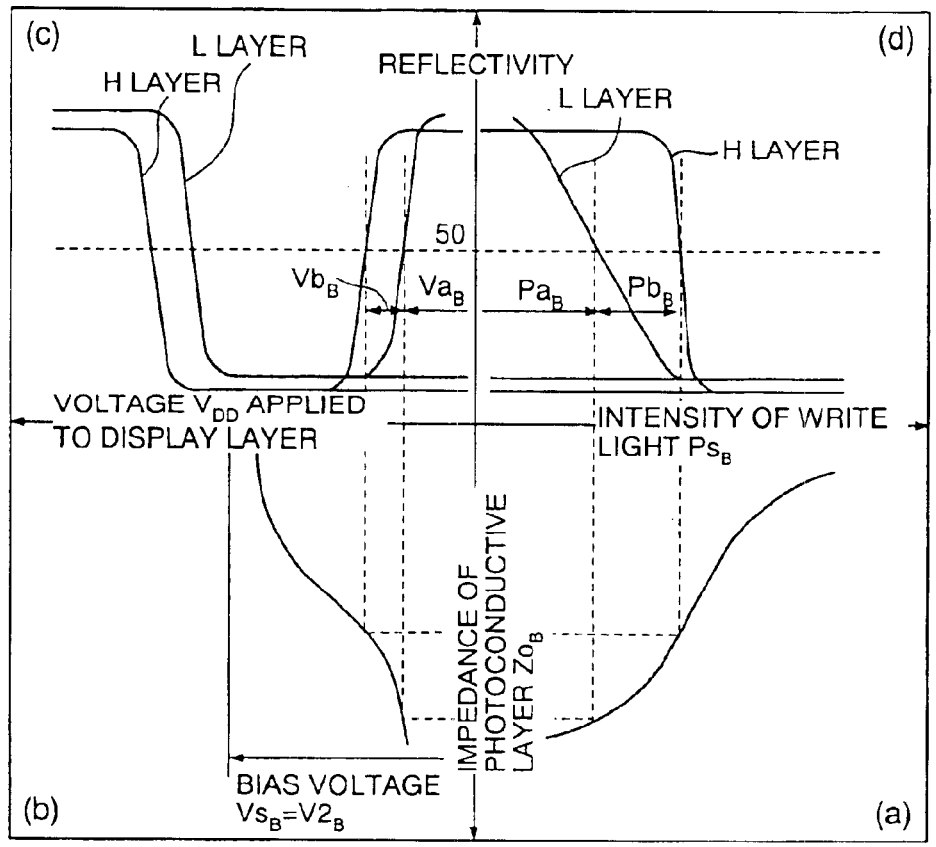
FIG. 28 is a schematic illustration of the electro-optic responses of the H layer and the L layer relative to the bias voltage $Vs_B$ and the intensity $Ps_B$ of write light in the select period $Ts_B$.
FIG. 29 is a schematic illustration of the electro-optic states of each of the light modulation layers when the voltages that are applied in the reset period $Tr_B$ and the select period $Ts_B$ are selected.

FIG. 28 shows the electro-optic responses of the H layer and the L layer relative to the bias voltage $Vs_B$ and the intensity $Ps_B$ of write light in the select period $Ts_B$.

In FIG. 28, part (a) of FIG. 28 shows a graph illustrating the relationship between the intensity $Ps_B$ of write light and the impedance $Z_{OB}$ of the photoconductive layer and part (b) of FIG. 28 shows a graph illustrating the relationship between the impedance $Z_{OB}$ of the photoconductive layer and the voltage $V_{DD}$ applied to the light modulation layers as put together of the light modulation element 16B, whereas part (c) of FIG. 28 shows a graph illustrating the reflectivity of the H layer and that of the L layer relative to the voltage $V_{DD}$ applied to the light modulation layers as put together of the light modulation element 16B and part (d) of FIG. 28 shows a graph illustrating the reflectivity of the H layer and that of the L layer relative to the intensity $Ps_B$ of write light 15 irradiated to the light modulation section 1 from the light irradiating section 14.

FIG. 29 illustrates the electro-optic states of each of the light modulation layers when the voltages that are applied in the reset period $Tr_B$ and the select period $Ts_B$ are selected in a manner as illustrated in FIG. 29 and described below.

Referring to FIG. 29, $V1_B$ having a magnitude that makes the voltage $V_{DD}$ being applied to the light modulation layers as put together of the light modulation element 16B to be equal to $Vc_B$ or $Vd_B$ in FIG. 27 is selected for the bias voltage $Vr_B$ and the intensity $Pr_B$ of write light is selected so as to be equal to $Pc_B$ or $Pd_B$ and used for irradiation in the reset period $Tr_B$. On the other hand, $V2_B$ having a magnitude that makes the voltage $V_{DD}$ being applied to the light modulation layers as put together to be equal to $Va_B$ or $Vb_B$ in FIG. 28 is selected for the bias voltage $Vs_B$ and the intensity $Ps_B$ of write light is selected so as to be equal to $Pa_B$ or $Pb_B$ and used for irradiation in the select period $Ts_B$.

For each of the combinations, the H layer and the L layer (the H layer is shown to the left of / whereas the L layer is shown to the right of /) respectively show the orientations as indicated by "○" and "●" in FIG. 29.

Note that "○" represents an orientation that selectively reflects light in a planar state and "●" represents an orientation that transmits light in a focal conic state.

As may be obvious from above, with this embodiment of light modulation method according to the invention to be used for the above described embodiment of light modulation medium, it is possible to provide four categories of orientation including:

one in which the H layer and the L layer are in a planar state;

one in which the H layer and the L layer are in a focal conic state;

one in which the H layer is in a planar state and the L layer is in a focal conic state; and one in which the H layer is in a focal conic state and the L layer is in a planar state.

FIGS. 30A to 30D show the wavelength ranges of light that the light modulation elements of this embodiment reflect, those of light that each of the light modulation elements absorbs and those of light to be irradiated on each of the light modulation elements.

Figure 30A:
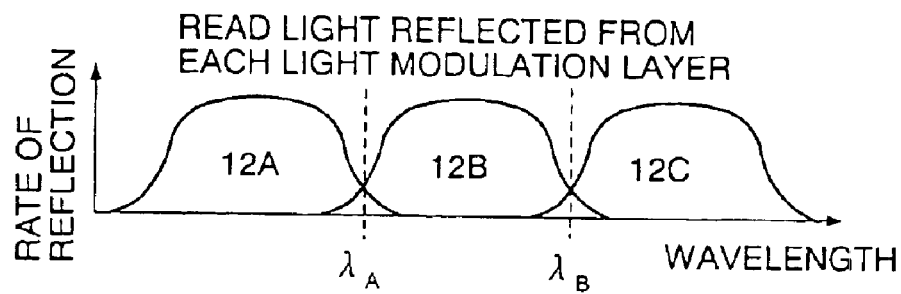
FIGS. 30A to 30D are a schematic illustration of the wavelength ranges of light that the light modulation elements of this embodiment reflect, those of light that each of the light modulation elements absorbs and those of light to be irradiated on each of the light modulation elements.
Figure 30B:
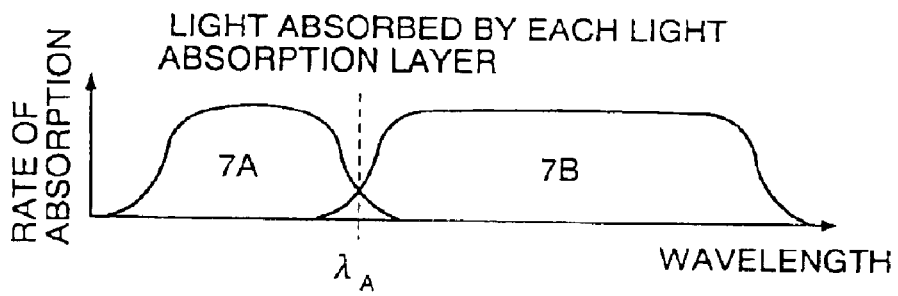
Figure 30C:
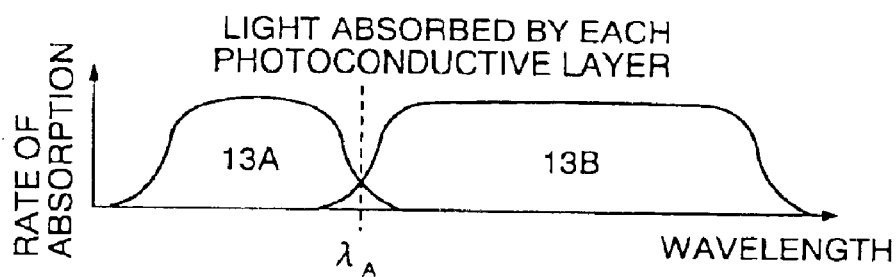
Figure 30D:
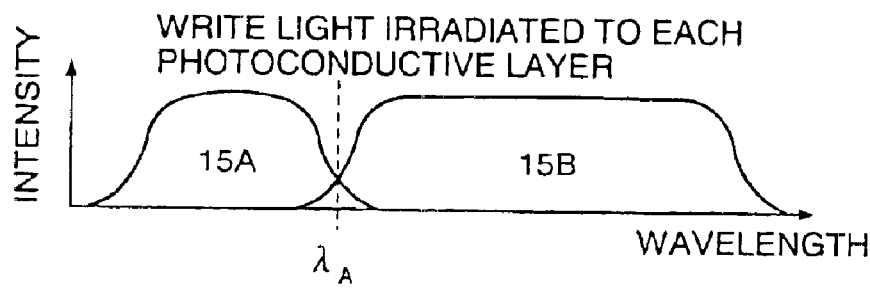

FIG. 30A shows the wavelength ranges of the beams of read light 12A, 12B, 12C that the light modulation layers of the light modulation elements 16A, 16B reflect and FIG. 30B shows the wavelength ranges of light that the light absorption layers 7A, 7B respectively absorb, while FIG. 30C shows the wavelength ranges of light that the photoconductive layers 13A, 13B respectively absorb and FIG. 30D shows the wavelength ranges of the beams of write light 15A, 15B with which the light modulation elements 16A, 16B are irradiated.

Therefore, if the light modulation medium 1 has a multilayer structure formed by arranging plural light modulation elements 16A, 16B as shown in FIG. 20, each of the light modulation elements 16A, 16B can be controlled individually by means of the above described write method without considering the mutual interference of the beams of write light 15A, 15B for driving the light modulation elements 16A, 16B to operate and the beams of read light 12A, 12B, 12C that are modulated by the light modulation elements 16A, 16B.

Figure 31:
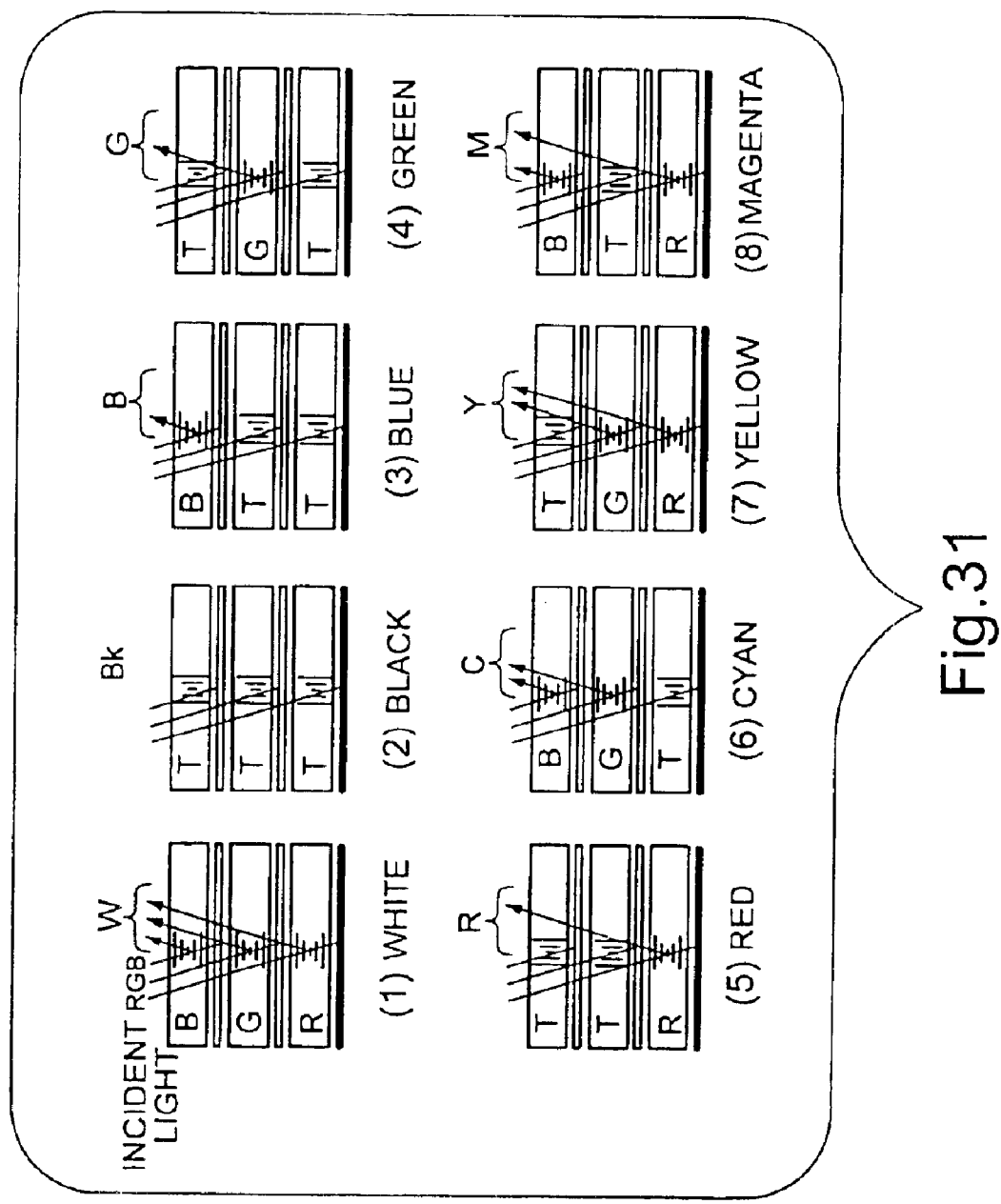
FIG. 31 is a schematic illustration of light modulation displays by the third embodiment of light modulation medium.

Therefore, when 500 nm and 600 nm are selected for the threshold wavelengths $\lambda_A$ and $\lambda_B$ and the optical modulation element 16A is designed as display element that selectively reflects blue light, while the light modulation layers 8B and 8C of the light modulation element 16B are designed respectively as display elements of H layer and L layer respectively that selectively reflect green light and red light for a light modulation medium according to the invention, then, by controlling the bias voltages Vr, Vs and the intensity of Pr, Ps of write light from the write device 2 as shown in FIG. 31, it is possible to produce:

(1) a state of displaying white (W) as a result of mixing red (R), green (G) and blue (B) by write signals $Vs_A=V1_A$, $Ps_A=Pb_A$, $Vr_B=V1_B$, $Pr_B=Pd_B$, $Vs_B=V2_B$ and $Ps_B=Pa_B$;

(2) a state of displaying black (K) as a result of a light transmitting condition (T) of the light modulation layers produced by write signals $Vs_A=V1_A$, $Ps_A=Pa_A$, $Vr_B=V1_B$, $Pr_B=Pc_B$, $Vs_B=V2_B$ and $Ps_B=Pb_B$;

(3) a state of displaying blue (B) by write signals $Vs_A=V1_A$, $Ps_A=Pb_A$, $Vr_B=V1_B$, $Pr_B=Pc_B$, $Vs_B=V2_B$ and $Ps_BPb_B$;

(4) a state of displaying green (G) by write signals $Vs_A=V1_A$, $Ps_A=Pa_A$, $Vr_B=V1_B$, $Pr_B=Pd_B$, $Vs_B=V2_B$ and $Ps_B=P_B$;

(5) a state of displaying red (R) by write signals $Vs_A=V1_A$, $Ps_A=Pa_A$, $Vr_B=V1_B$, $Pr_B=Pc_B$, $Vs_B=V2_B$ and $Ps_B=Pa_B$;

(6) a state of displaying cyan (C) as a result of mixing blue (B) and green (G) that are obtained by write signals $Vs_A=V1_A$, $Ps_A=Pb_A$, $Vr_B=V1_B$, $Pr_B=Pd_B$, $Vs_B=V2_B$ and $Ps_B=Pb_B$;

(7) a state of displaying yellow (Y) as a result of mixing green (G) and red (R) that are obtained by write signals $Vs_A=V1_A$, $Ps_A=Pa_A$, $Vr_B=V1_B$, $Pr_B=Pd_B$, $Vs_B=V2_B$ and $Ps_B=Pa_B$; and (8) a state of displaying magenta (M) as a result of mixing blue (B) and red (R) that are obtained by write signals $Vs_A=V1_A$, $Ps_A=Pb_A$, $Vr_B=V1_B$, $Pr_B=Pc_B$, $Vs_B=V2_B$ and $Ps_B=Ps_B$.

Since eight colors can be displayed in a controlled manner, it is possible to display eight different colors of white, black, blue, green, red, cyan, yellow and magenta in each pixel of a light modulation medium.

Now, an example in which a light modulation medium that can display green and red was prepared will be described below.

EXAMPLE 1

Cholesteric liquid crystal adapted to selectively reflect green light was prepared by mixing a 95.0 weight % of nematic liquid crystal showing positive dielectric constant anisotropy (available from Seimi Chemical) and a 5.0 weight % of dicyano-type nematic liquid crystal showing negative dielectric constant anisotropy (1-n-butoxy-4-(4'-trans-n-pentylcyclohexylcarboxy)-2,3-dicyanobenzene) and a 14.4 weight % of chiral ingredient 1 (R811: tradename, available from Merck) and a 3.6 weight % of chiral ingredient 2 (R1011: tradename, available from Merck) were added to the mixture.

Cholesteric liquid crystal adapted to selectively reflect red light was prepared by mixing a 84.0 weight % of nematic liquid crystal showing positive dielectric constant anisotropy (ZL13806: tradename, available from Merck), a 12.8 weight % of chiral ingredient 1 (R811: tradename, available from Merck) and a 3.2 weight % of chiral ingredient 2 (R1011: tradename, available from Merck).

A light absorption layer was formed on a 0.7 mm thick glass substrate (7059: tradename, available from Corning), on which an ITO transparent electrode had been formed by sputtering, to a thickness of 2 μm by spin coating a polyvinyl alcohol solution that contained carbon black pigment in a dispersed state. Additionally, a vertically oriented film of liquid crystal (SE7511L: tradename, available from Nissan Chemical) was applied to a thickness of 10 nm by spin coating and then the above described red cholesteric liquid crystal, in which spherical spacers having a diameter of 10 μm (SP210: tradename, available from Sekisui Fine Chemical) had been dispersed at a rate of 0.2 weight %, was dropped. Then, a 4.5 μm thick PET film (Lumirror: tradename, available from Toray) supported by a plastic frame was made to tightly adhere to it. Thereafter, the above described green cholesteric liquid crystal, in which spherical spacers having a diameter of 10 μm (SP210: tradename, available from Sekisui Chemical) had been dispersed at a rate of 0.2 weight %, was dropped and a 0.7 mm thick glass substrate (7059: tradename, available from Corning), on which an ITO transparent electrode had been formed by sputtering, was made to tightly adhere to it to produce a light modulation medium.

The obtained light modulation medium was connected to a write device having a control section of a spontaneous waveform generator (2714A: tradename, available from Biomation) and a voltage applying section of a high voltage source (609C: tradename, available from Treck).

A refresh signal of 50 Hz and a 50 Hz of select signal were applied from the write device to the light modulation medium for 200 ms each and the read light from the light modulation medium was observed by means of integrated spherical type spectrophotometric calorimeter (CM2022: tradename, available from Minolta) to determine the electro-optic response of the light modulation medium.

For the purpose of individually assessing the characteristics of each of the light modulation layers, assessment specimens were prepared by injecting the prepared green and red cholesteric liquid crystals respectively into vertically orientated glass cells having a light absorption layer same as the above-described one that had been formed on the rear surface with a 10 μm gap (available from EHC) by means of capillary injection. Then, the electro-optic response of each of the specimens was observed by means of the above process and its dielectric characteristic was observed by means of an impedance meter to be used for dielectrics (129660W: tradename, available from Solartron).

Example for Comparison

Unlike the specimen of the above described example, a specimen was prepared without using dicyano-type nematic liquid crystal showing negative dielectric constant anisotropy for the cholesteric liquid crystal for selectively reflecting green light.

Figure 32A:
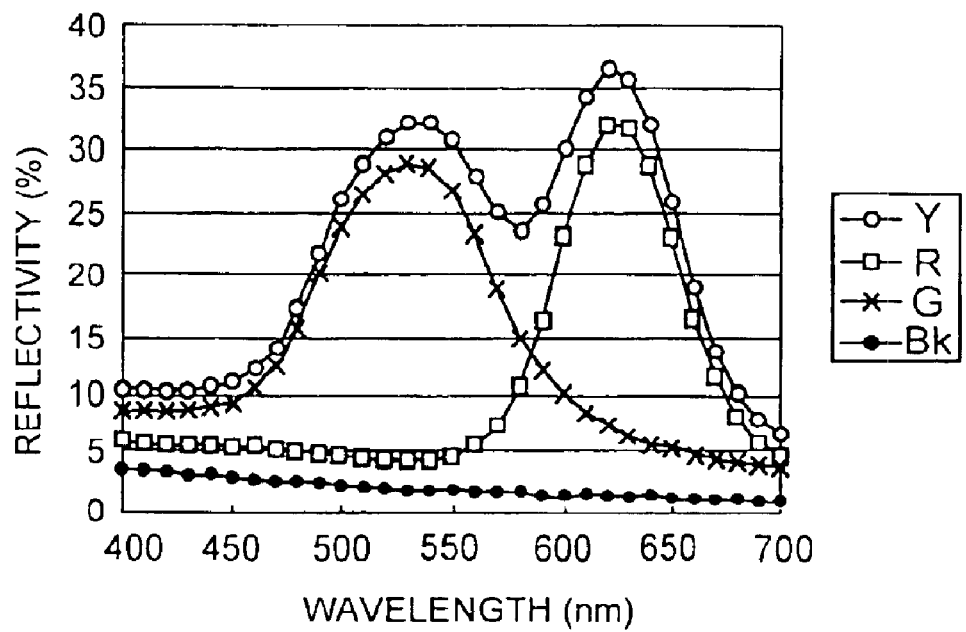
FIGS. 32A and 32B are a schematic illustration of the spectrums (observed values) of the specimens of light modulation medium.
Figure 32B:
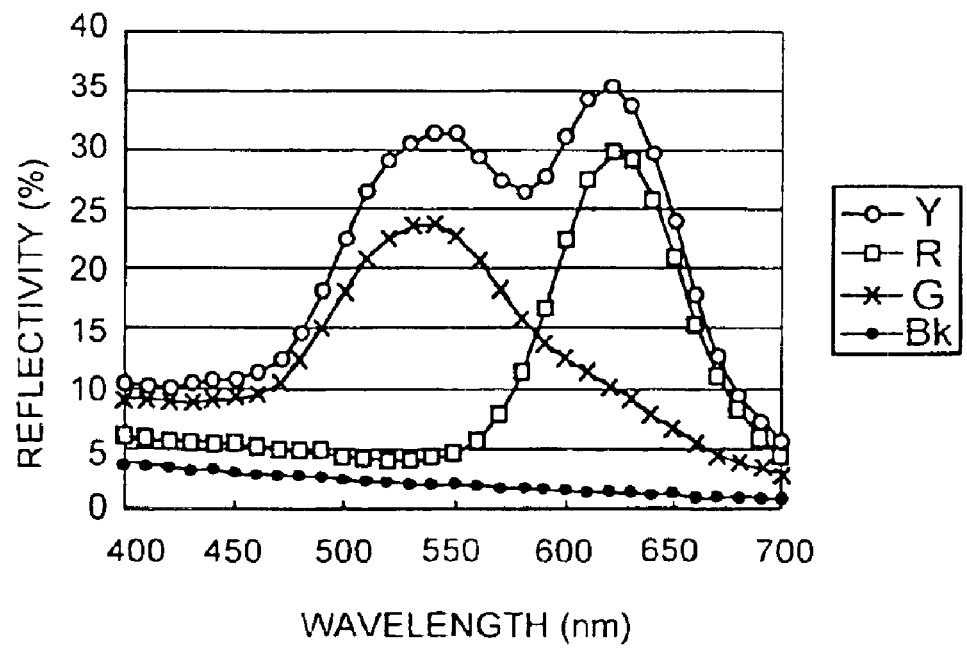

FIGS. 32A and 32B show the spectrums (observed values) of the specimens of light modulation medium. FIG. 32A shows the spectrum of the specimen of Example and FIG. 32B shows that of the specimen of Example for Comparison.

As seen from FIGS. 32A and 32B, the specimen of light modulation medium of Example that had liquid crystal for displaying green containing dicyano-type nematic liquid crystal showing negative dielectric constant anisotropy showed a reflectivity much higher than the specimen of Example for Comparison particularly in terms of green color.

Figure 33:
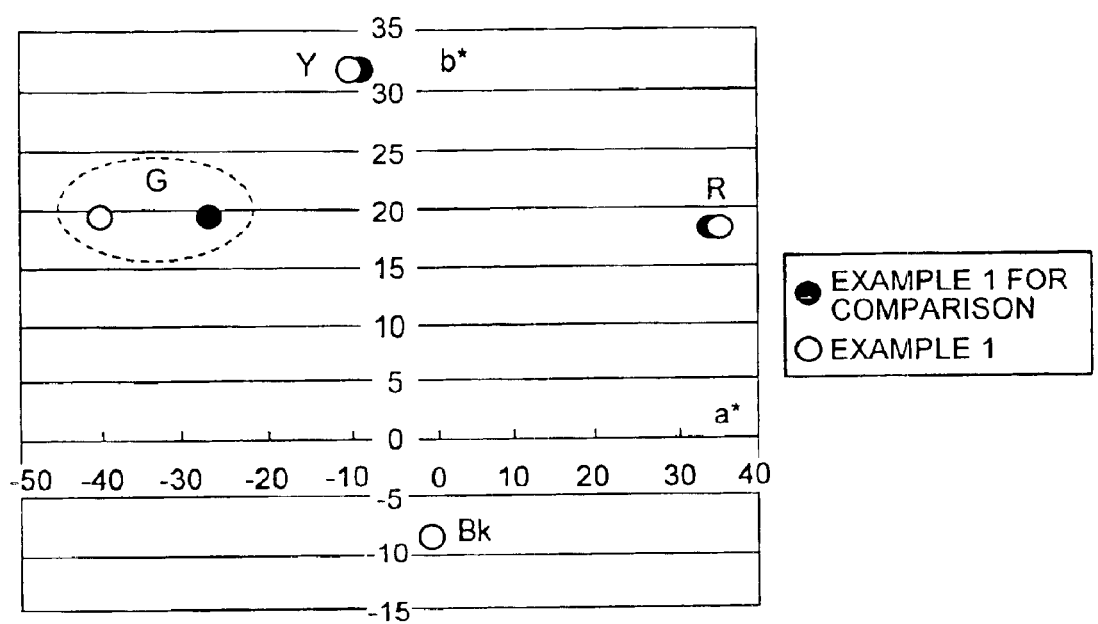
FIG. 33 is a schematic illustration of chromaticity (a*, b*) of read light.

FIG. 33 shows chromaticity (a*, b*) of read light. In FIG. 33, ○ represents Example and ● represents Example for Comparison.

As may be clear from FIG. 33, the specimen of light modulation medium of Example provided a color reproduction range much broader than that of the specimen of Example for Comparison. Particularly, the improvement of the specimen of Example 1 in terms of reproducibility of green color was remarkable.

What is claimed is:

1. A light modulation medium comprising a light modulation element having a pair of substrates and a plurality of light modulation layers arranged between the substrates to form a multilayer structure and made of cholesteric liquid crystal adapted to change the electro-optic characteristics in response to application of a predetermined electric field, wherein the ratio of the threshold electric field at which the liquid crystal orientation is moved from a planar state to a focal conic state of a first light modulation layer of the light modulation element to that of a second light modulation layer is not less than 0.3 and the ratio of the dielectric constant in a planar state of liquid crystal orientation of the first light modulation layer to that of the second light modulation layer is not less than 4.

2. The light modulation medium according to claim 1, wherein the cholesteric liquid crystal of at least one of the plurality of light modulation layers is a mixture of a liquid crystal compound showing positive dielectric constant anisotropy and a liquid crystal compound showing negative dielectric constant anisotropy and shows positive dielectric constant anisotropy.

3. The light modulation medium according to claim 2, wherein the liquid crystal compound showing negative dielectric constant anisotropy has polar groups extending in the direction of the short axis of the liquid crystal molecule and at least one of the polar groups extending in the direction of the short axis is a cyano group.

4. The light modulation medium according to claim 1, wherein
the cholesteric liquid crystal of each of the plurality of light modulation layers selectively reflects light of a particular wavelength range out of incident light and the cholesteric liquid crystals of the light modulation layers have respective wavelength ranges that are different from each other.

5. The light modulation medium according to claim 1, wherein
the pair of substrates carry respective electrodes formed on the inner surfaces thereof; and
the plurality of light modulation layers are arranged between the electrodes to form a multilayer structure.

6. The light modulation medium according to claim 5, wherein
the light modulation element is formed by arranging the plurality of light modulation layers and a photoconductive layer adapted to change its electric resistance in response to irradiation of light between the electrodes to produce a multilayer structure.

7. A light modulation method of preparing a light modulation medium that includes a light modulation element having a pair of substrates carrying respective electrodes formed on the inner surfaces thereof and a plurality of light modulation layers arranged between the substrates to form a multilayer structure and made of cholesteric liquid crystal adapted to change the liquid crystal orientation in response to application of a predetermined electric field, comprising the steps of:
preparing the light modulation medium in which the ratio of the threshold electric field at which the liquid crystal orientation is moved from a planar state to a focal conic state of a first light modulation layer of the plurality of light modulation layers to that of a second light modulation layer is not less than 0.3 and the ratio of the dielectric constant in a planar state of liquid crystal orientation of the first light modulation layer to that of the second light modulation layer is not less than 4; and
causing the light modulation medium to display a color tone corresponding to the combination of electro-optic characteristics of the plurality of light modulation layers by sequentially applying a plurality of voltages to change the liquid crystal orientations of the plurality of light modulation layers between the electrodes and moving each of the light modulation layers to a planar or focal conic state.

8. The light modulation method according to claim 7, wherein
the cholesteric liquid crystal of each of the plurality of light modulation layers selectively reflects light of a particular wavelength range out of incident light and the cholesteric liquid crystals of the light modulation layers have respective wavelength ranges that are different from each other.

9. The light modulation method according to claim 7, wherein
the light modulation medium is formed by arranging the plurality of light modulation layers and a photoconductive layer adapted to change its electric resistance in response to irradiation of light between the electrodes to produce a multilayer structure; and
wherein the light modulation medium displays a color tone corresponding to the combination of the electro-optic characteristics of the plurality of light modulation layers by irradiating light to the photoconductive layer at a predetermined rate as a function of application of the plurality of voltages between the electrodes.

10. The light modulation method according to claim 9, wherein
the light modulation medium comprises another light modulation element formed by arranging at least a light modulation layer and a photoconductive layer between a pair of electrodes in addition to the light modulation element and the photoconductive layers are irradiated with respective beams of light having different wavelength ranges.

* * * * *